(12) United States Patent
Takahama

(10) Patent No.: US 12,403,733 B2
(45) Date of Patent: Sep. 2, 2025

(54) VEHICLE HITCHING ASSIST APPARATUS, VEHICLE HITCHING ASSIST METHOD, AND VEHICLE HITCHING ASSIST SYSTEM

(71) Applicant: Hitachi Astemo, Ltd., Hitachinaka (JP)

(72) Inventor: Taku Takahama, Yokohama (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 893 days.

(21) Appl. No.: 17/270,266

(22) PCT Filed: Jul. 22, 2019

(86) PCT No.: PCT/JP2019/028610
§ 371 (c)(1),
(2) Date: Feb. 22, 2021

(87) PCT Pub. No.: WO2020/039814
PCT Pub. Date: Feb. 27, 2020

(65) Prior Publication Data
US 2021/0339588 A1   Nov. 4, 2021

(30) Foreign Application Priority Data
Aug. 23, 2018   (JP) .................... 2018-156122

(51) Int. Cl.
*B60D 1/36* (2006.01)
*B60D 1/62* (2006.01)
(Continued)

(52) U.S. Cl.
CPC .............. *B60D 1/36* (2013.01); *B60D 1/62* (2013.01); *B62D 15/02* (2013.01); *G05D 1/0221* (2013.01); *G05D 1/0231* (2013.01)

(58) Field of Classification Search
CPC . B60D 1/36; B60D 1/62; B62D 15/02; B62D 13/06; B62D 15/0285;
(Continued)

(56) References Cited

U.S. PATENT DOCUMENTS

2002/0149673 A1* 10/2002 Hirama .............. B60R 1/00
                                                    348/E7.087
2013/0076007 A1*  3/2013 Goode ............... B60R 1/003
                                                    348/148
(Continued)

FOREIGN PATENT DOCUMENTS

JP    2013-530867 A    8/2013
JP    2016-203972 A   12/2016
(Continued)

OTHER PUBLICATIONS

International Search Report (PCT/ISA/210) issued in PCT Application No. PCT/JP2019/028610 dated Oct. 1, 2019 with English translation (five (5) pages).
(Continued)

*Primary Examiner* — Mohamed Abdo Algehaim
(74) *Attorney, Agent, or Firm* — Crowell & Moring LLP

(57) ABSTRACT

A vehicle hitching assist apparatus according to the present invention includes a first mode configured to, when an image pattern of a second hitch portion provided on a trailer is acquired, detect a position of the second hitch portion based on a comparison between the image pattern and an image acquired by an external world perception sensor mounted on a rear portion of a vehicle and output a steering instruction for assisting in hitching between the trailer and the vehicle based on the detected position of the second hitch portion to a steering controller of the vehicle, and a second mode configured to, when the image pattern is not acquired, issue a notification for prompting a driver of the vehicle to manually hitch the trailer and the vehicle.

9 Claims, 23 Drawing Sheets

(51) Int. Cl.
*B62D 15/02* (2006.01)
*G05D 1/00* (2024.01)

(58) Field of Classification Search
CPC .......... B60W 10/20; B60W 30/18036; B60W 50/14; B60W 2300/14; G05D 1/0221; G05D 1/0231; G05D 2201/0213; G06V 10/00–2201/136; B60R 1/003
USPC .......................................................... 701/28
See application file for complete search history.

(56) References Cited

U.S. PATENT DOCUMENTS

| | | | |
|---|---|---|---|
| 2013/0085637 A1 | 4/2013 | Grimm et al. | |
| 2014/0058614 A1* | 2/2014 | Trombley | B62D 15/027 701/29.1 |
| 2014/0200759 A1* | 7/2014 | Lu | G06T 7/73 701/28 |
| 2014/0267688 A1* | 9/2014 | Aich | B60W 30/00 348/113 |
| 2016/0023601 A1* | 1/2016 | Windeler | B60D 1/06 348/118 |
| 2016/0052548 A1* | 2/2016 | Singh | G06V 20/58 701/41 |
| 2016/0272024 A1* | 9/2016 | Bochenek | B60D 1/06 |
| 2016/0304122 A1 | 10/2016 | Herzog et al. | |
| 2017/0151846 A1 | 6/2017 | Wuergler et al. | |
| 2018/0001721 A1* | 1/2018 | Hüger | G05D 1/0225 |
| 2018/0147900 A1* | 5/2018 | Shank | G06V 10/245 |
| 2019/0092109 A1* | 3/2019 | Carpenter | G06V 20/56 |
| 2019/0172218 A1* | 6/2019 | Maruoka | B60K 35/10 |
| 2019/0297233 A1* | 9/2019 | Gali | G06T 7/248 |
| 2019/0335100 A1* | 10/2019 | Chen | G06T 7/277 |
| 2019/0359134 A1* | 11/2019 | Yamamoto | B62D 13/00 |
| 2020/0001790 A1* | 1/2020 | Ling | B60D 1/62 |
| 2020/0017143 A1* | 1/2020 | Gali | G06T 7/70 |
| 2020/0023696 A1* | 1/2020 | Ling | B60R 1/00 |
| 2020/0079165 A1* | 3/2020 | Niewiadomski | B62D 15/0285 |
| 2020/0164920 A1* | 5/2020 | Maruoka | B62D 15/029 |
| 2020/0307328 A1* | 10/2020 | Köster | G01C 3/08 |
| 2021/0122416 A1* | 4/2021 | Ling | B60K 35/00 |
| 2021/0370912 A1* | 12/2021 | Yamamoto | H04N 7/18 |

FOREIGN PATENT DOCUMENTS

| | | | |
|---|---|---|---|
| JP | 2017-502866 A | 1/2017 | |
| WO | WO-2017152234 A1 * | 9/2017 | ............... B60D 1/36 |

OTHER PUBLICATIONS

Japanese-language Written Opinion (PCT/ISA/237) issued in PCT Application No. PCT/JP2019/028610 dated Oct. 1, 2019 with English translation (14 pages).

Extended European Search Report issued in European Application No. 19853114.7 dated Jul. 27, 2021 (11 pages).

* cited by examiner

HITCHING ASSIST: HIGHLY DIFFICULT

HITCHING ASSIST: LESS DIFFICULT

VEHICLE HITCHING ASSIST APPARATUS, VEHICLE HITCHING ASSIST METHOD, AND VEHICLE HITCHING ASSIST SYSTEM

TECHNICAL FIELD

The present invention relates to a vehicle hitching assist apparatus, a vehicle hitching assist method, and a vehicle hitching assist system that assist in hitching between a trailer and a vehicle.

BACKGROUND ART

PTL1 discloses a vehicle hitching assist apparatus that detects a trailer targeted for hitching, determines a route of a vehicle for hitching this vehicle to the above-described trailer, and controls steering and braking for moving the above-described vehicle along the determined route.

CITATION LIST

Patent Literature

PTL 1: Japanese Patent Application Public Disclosure No. 2016-203972

SUMMARY OF INVENTION

Technical Problem

Then, the assist in the hitching between the vehicle and the trailer requires highly accurate detection of the position of a hitch portion (a hitch coupler) provided on the trailer and a highly accurate movement of the vehicle toward the trailer.

However, although disclosing that the position of the hitch portion provided on the trailer is detected based on an image of a camera, PTL 1 does not disclose a specific method for detecting the position, thereby raising a possibility that the hitching assist fails to sufficiently function due to an error or a failure in the position detection.

An object of the present invention is to provide a vehicle hitching assist apparatus, a vehicle hitching assist method, and a vehicle hitching assist system capable of highly accurately detecting a position of a hitch portion provided on a trailer, thereby improving hitching accuracy.

Solution to Problem

One aspect of the present invention includes a first mode configured to, when an image pattern of a second hitch portion provided on a trailer is acquired, detect a position of the second hitch portion based on a comparison between the image pattern and an image acquired by an external world perception sensor mounted on a rear portion of a vehicle and output a steering instruction for assisting in hitching between the trailer and the vehicle based on the detected position of the second hitch portion to a steering controller of the vehicle, and a second mode configured to, when the image pattern is not acquired, issue a notification for prompting a driver of the vehicle to manually hitch the trailer and the vehicle.

Advantageous Effects of Invention

According to the one aspect of the present invention, it is possible to highly accurately detect the position of the hitch portion provided on the trailer, thereby improving the hitching accuracy.

DESCRIPTION OF EMBODIMENTS

In the following description, embodiments of a vehicle hitching assist apparatus, a vehicle hitching assist method, and a vehicle hitching assist system will be described with reference to the drawings.

Figure 1:
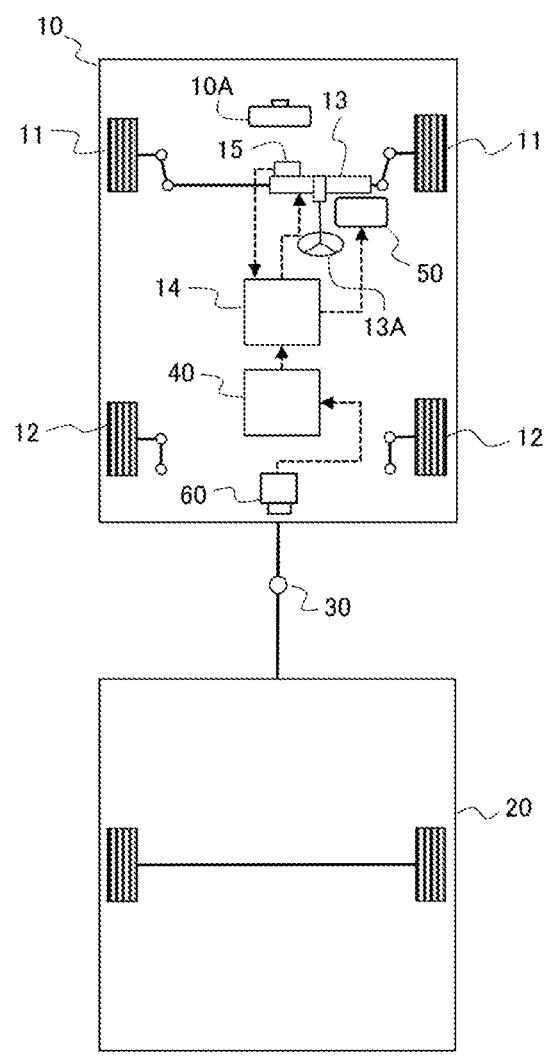
FIG. 1 illustrates the configuration of a vehicle including a vehicle hitching assist system.

FIG. 1 illustrates the configuration of a vehicle 10 including the vehicle hitching assist system according to the present invention.

The vehicle 10 is a four-wheeled vehicle including a pair of front left and right wheels 11, 11 and a pair of rear left and right wheels 12, 12, and is a tow vehicle that tows a trailer 20 (a towed vehicle).

The vehicle 10 and the trailer 20 are hitched via a hitch portion (a hitch) 30.

The vehicle 10 includes an electric power steering apparatus 13, which operates the steering angles of the front wheels 11, 11. The electric power steering apparatus 13 includes a steering actuator such as a motor that generates a steering force, and is a steering apparatus that can autonomously steer the vehicle 10.

A hitching assist control unit 40 is an electronic control apparatus including a microcomputer equipped with a CPU, a ROM, a RAM, and the like, and is a vehicle hitching assist apparatus (a controller) that performs control for assisting in the hitching between the vehicle 10 and the trailer 20.

When a request for the hitching assist is issued from a driver of the vehicle 10, the hitching assist control unit 40 sets a target trajectory, which is a route for moving back the vehicle 10 to a position where the vehicle 10 is hitched to the trailer 20, and sets a target steering angle of the front wheels 11, 11 so as to move back the vehicle 10 along this target trajectory as the hitching assist control.

Then, the hitching assist control unit 40 outputs a signal of the target steering angle (a steering angle instruction) to a steering control unit 14, which is a steering controller that controls the electric power steering apparatus 13 (the steering actuator).

The steering control unit 14 is an electronic control apparatus including a microcomputer equipped with a CPU, a ROM, a RAM, and the like, and controls the steering actuator (the motor) of the electric power steering apparatus 13 in such a manner that the steering angles of the front wheels 11, 11 detected by a front-wheel steering angle sensor 15 become closer to the target steering angle upon receiving the signal of the target steering angle from the hitching assist control unit 40.

In other words, the hitching assist control unit 40 guides the vehicle 10 to the position for the hitch to the trailer 20 by controlling the steering angles of the front wheels 11, 11, thereby providing the assist so as to facilitate the hitching work.

An information display 50, which is a screen display apparatus such as a liquid crystal display, is provided near a driver's seat of the vehicle 10.

Then, the hitching assist control unit 40 has a function of displaying, for example, a notification matter addressed to the driver of the vehicle 10 on the information display 50 as a part of the hitching assist control.

Further, a rear camera 60, which is a camera (an imaging apparatus) that captures an image behind the vehicle 10, is mounted on the rear portion of the vehicle 10 as an external world perception sensor.

Figure 2:
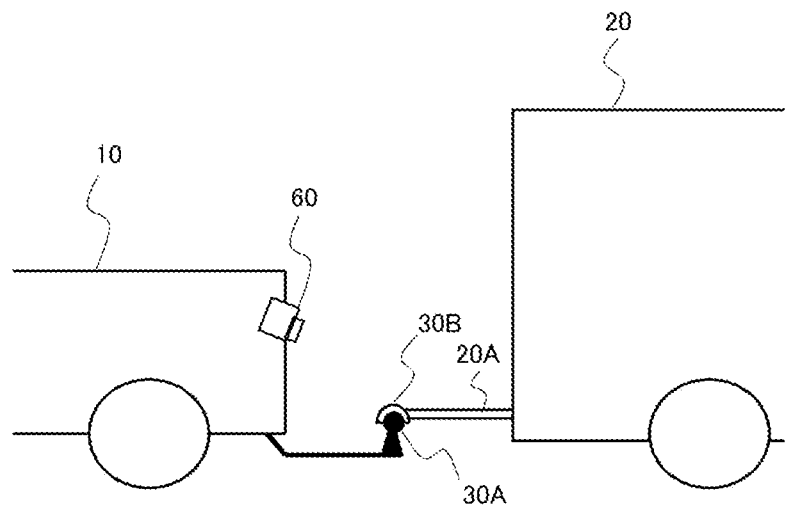
FIG. 2 is a side view of a hitch portion between the vehicle and a trailer.

FIG. 2 illustrates the configuration of the hitch portion (the hitch) 30.

The hitch portion 30 includes a hitch ball 30A (a first hitch portion) and a hitch coupler 30B (a second hitch portion). The hitch ball 30A is disposed at the rear portion of the vehicle 10. The hitch coupler 30B is provided at the distal end of an arm 20A extending forward from the trailer 20, and is detachably connected to the hitch ball 30A.

Then, the hitch coupler 30B holds the hitch ball 30A so as to cover the upper portion of the hitch ball 30A, by which the hitch ball 30A and the hitch coupler 30B are connected to each other.

The rear camera 60 is mounted on the rear portion of the vehicle 10 with the angle of view, the installation height, the installation angle, and the like thereof adjusted so as to allow the hitch ball 30A provided on the vehicle 10 to be displayed at a predetermined position on the screen.

Figure 3:
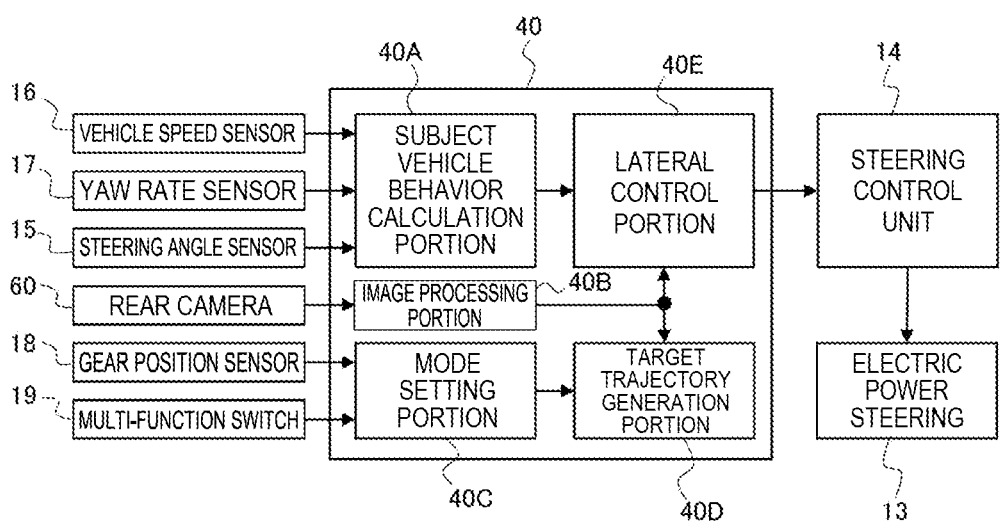
FIG. 3 is a block diagram of the configuration of a hitching assist control system.
Figure 4:
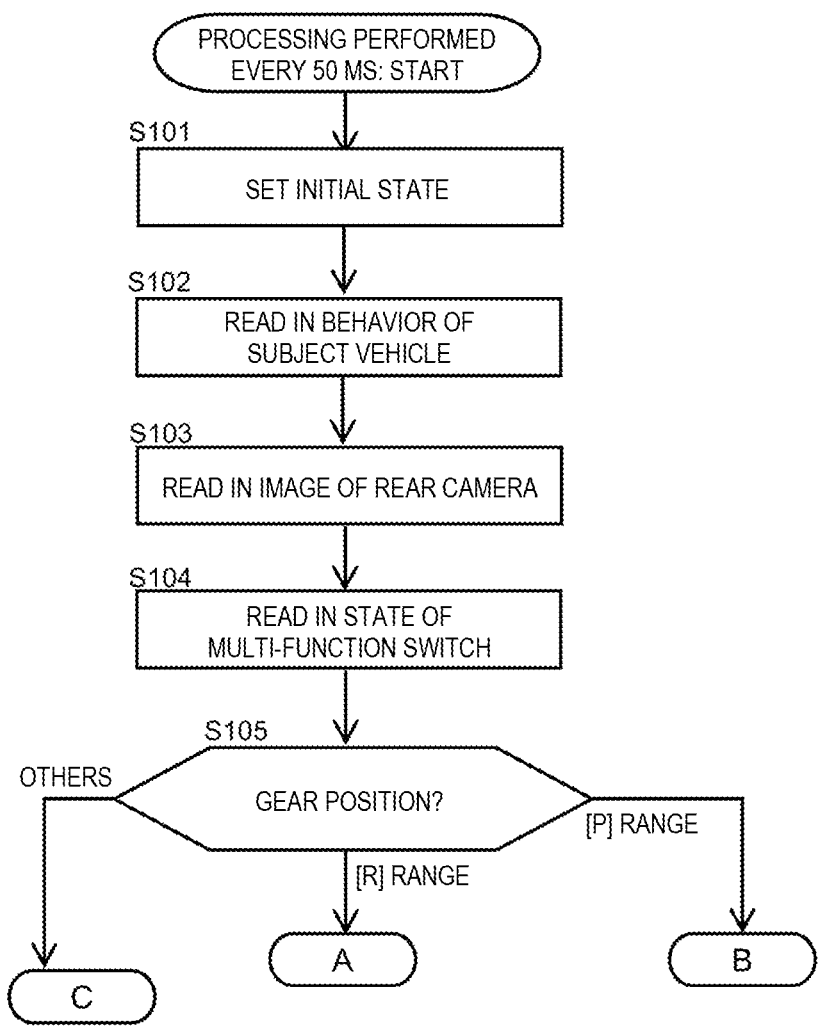
FIG. 4 is a flowchart illustrating a procedure for a hitching assist.
Figure 5:
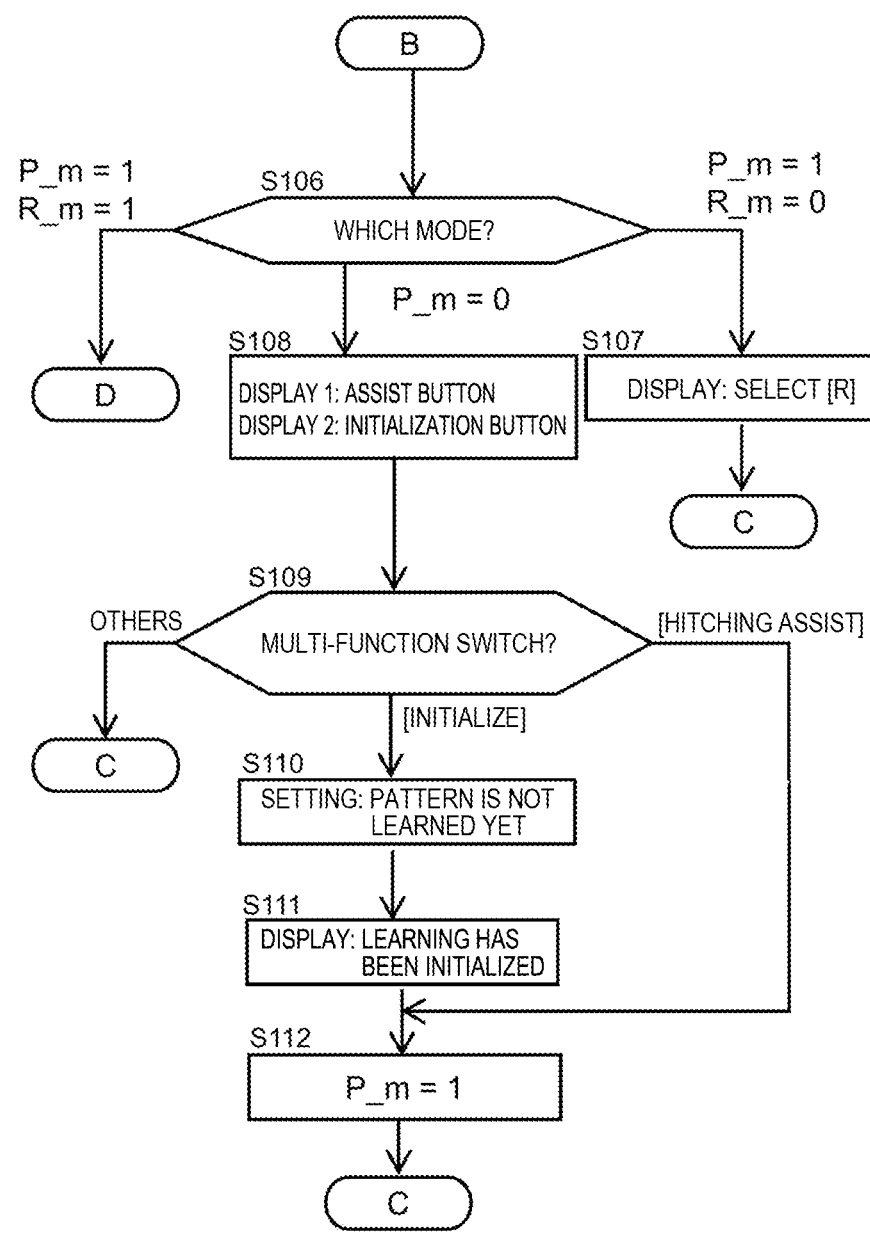
FIG. 5 is a flowchart illustrating the procedure for the hitching assist.
Figure 6:
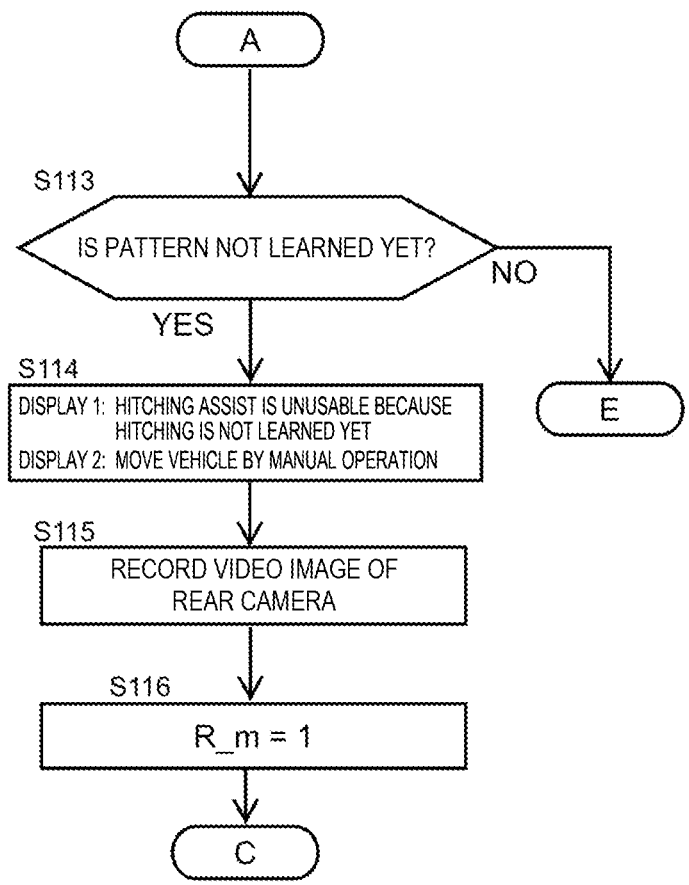
FIG. 6 is a flowchart illustrating the procedure for the hitching assist.
Figure 7:
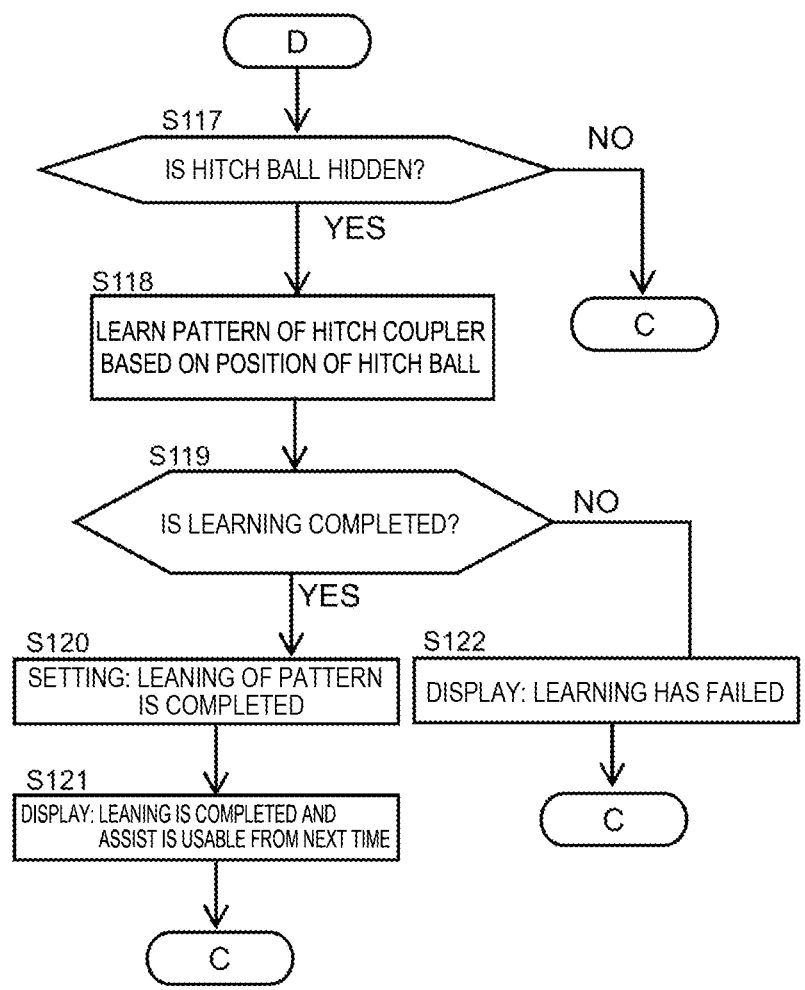
FIG. 7 is a flowchart illustrating the procedure for the hitching assist.

FIG. 3 is a block diagram of the configuration of the vehicle hitching assist system.

The hitching assist control unit 40 inputs an image signal from the rear camera 60 and a front-wheel steering angle signal $\alpha$ from the front-wheel steering angle sensor 15.

Further, the hitching assist control unit 40 inputs a vehicle speed V from a vehicle speed sensor 16, which detects the running speed (the vehicle speed) of the vehicle 10, a yaw rate signal $\gamma$ from a yaw rate sensor 17, which detects the yaw rate of the vehicle 10, a gear position signal (a gearshift position signal) GP from a gear position sensor 18, which detects the gear position (the gearshift position) of the transmission of the vehicle 10, an output signal from a multi-function switch (a hitching assist operation switch) 19 used for the driver of the vehicle 10 to input an instruction regarding the hitching assist control, and the like.

The multi-function switch 19 is mounted on, for example, a steering wheel 13A of the vehicle 10, and is an operation switch such as a press-button switch arbitrarily operated by the driver.

The driver issues an instruction to execute the hitching assist (an instruction to carry out the autonomous steering) and an instruction to initialize the hitching assist (a reset instruction or an instruction to learn an image pattern) by operating the multi-function switch 19.

For example, the multi-function switch 19 includes a press-button switch labeled "Hitching Assist" and a press-button switch labeled "Initialize".

Then, when the driver presses the "Hitching Assist" button (a driving assist execution switch), a signal indicating the request to execute the hitching assist is output to the hitching assist control unit 40. When the driver presses the "Initialize" button (a driving assist initialization switch), a signal indicating an instruction to initialize the hitching assist is output to the hitching assist control unit 40.

The hitching assist control unit 40 includes functions of a subject vehicle behavior calculation portion 40A, an image processing portion 40B, a mode setting portion 40C, a target trajectory generation portion 40D, and a lateral control portion 40E in the form of software, as calculation processing functions based on the above-described various kinds of input signals.

The subject vehicle behavior calculation portion 40A calculates the behavior of the vehicle 10 (a subject vehicle)

during the hitching assist based on the vehicle speed signal V, the yaw rate signal γ, a front-wheel steering angle signal α, and the like.

The image processing portion 40B, for example, extracts the hitch coupler 30B by processing an image signal from the rear camera 60.

The mode setting portion 40C sets a mode of the hitching assist control based on the gear position signal GP, the output signal from the multi-function switch 19 (the instruction regarding the hitching assist from the driver), and the like.

The target trajectory generation portion 40D generates a target trajectory of the vehicle 10 used when moving back the vehicle 10 to hitch the vehicle 10 to the trailer 20 based on the result of the image processing by the image processing portion 40B and the mode setting by the mode setting portion 40C.

The lateral control portion 40E sets the target steering angle of the front wheels 11, 11 to move back the vehicle 10 along the target trajectory based on the result of the image processing by the image processing portion 40B, the subject vehicle behavior calculated by the subject vehicle behavior calculation portion 40A, and the target trajectory generated by the target trajectory generation portion 40D, and outputs a signal of this target steering angle (a steering angle instruction) to the steering control unit 14.

In the following description, the details of the hitching assist control by the hitching assist control unit 40 will be described with reference to flowcharts illustrated in FIGS. 4 to 8.

The routine indicated in the flowcharts illustrated in FIGS. 4 to 8 is timer interrupt processing performed every predetermined time (for example, 50 ms).

In step S101, the hitching assist control unit 40 performs initialization processing.

At this time, if this is the first time that the hitching assist control unit 40 has been powered on, the hitching assist control unit 40 sets a learning flag FHK for distinguishing whether the image pattern of the hitch coupler 30B is already learned or not to zero indicating that this image pattern is not learned yet (FHK=0).

Further, if this is the first processing timing after the driving switch of the vehicle 10 (a power switch, an ignition switch, or an engine switch) is switched on (after the vehicle 10 is powered on), the hitching assist control unit 40 resets each of variables P_m and R_m indicating the control state for each gear position to zero indicating the initial state (P_m=0 and R_m=0).

Subsequently, in step S102, the hitching assist control unit 40 reads in vehicle information (information indicating the behavior of the subject vehicle) such as the vehicle speed V, the steering angle α, and the gear position signal GP of the vehicle 10.

Further, in step S103, the hitching assist control unit 40 reads in the image captured by the rear camera 60.

Further, in step S104, the hitching assist control unit 40 reads in the instruction signal of the multi-function switch 19, i.e., the instruction signal indicating the driver's intension regarding the hitching assist (the execution of the hitching assist, the initialization of the hitching assist, or the like).

Then, in step S105, the hitching assist control unit 40 determines which position the gear position (the gearshift position) of the vehicle 10 is, a P range (a parking range), an R range (a reverse range), a range other than the P range and the R range (a D range, an N range, and the like).

At this time, the hitching assist control unit 40 proceeds to step S106, step S113, and step S131 if the gear position of the vehicle 10 is the P range, is the R range, and is neither the P range nor the R range, respectively.

If the gear position of the vehicle 10 is the P range and the hitching assist control unit 40 proceeds to step S106, the hitching assist control unit 40 determines the mode based on the variables P_m and R_m.

The hitching assist control unit 40 proceeds to step S108 if P_m=0, to step S107 if P_m=1 and R_m=0, and to step S117 if P_m=1 and R_m=1.

If P_m=1 and R_m=0 and the hitching assist control unit 40 proceeds to step S107, the hitching assist control unit 40 displays the following display content 107 on the information display 50.

Display Content 107: "Step on the brake and lock the gearshift at the R range." On the other hand, if P_m=0 and the hitching assist control unit 40 proceeds to step S108, the hitching assist control unit 40 displays the following two display contents 108-1 and 108-2 on the information display 50.

Display Content 108-1: "To request the hitching assist, press the "Hitching Assist" button."

Display Content 108-2: "To change the trailer, press the "Initialize" button."

After the display processing in step S108, the hitching assist control unit 40 proceeds to step S109 and determines the operation state of the multi-function switch 19.

Then, the hitching assist control unit 40 proceeds to step S110, step S112, and step S131 if the "Initialize" button is pressed, if the "Hitching Assist" button is pressed, and if the multi-function switch 19 is in a non-operated state without the "Initialize" button and the "Hitching Assist" button pressed, respectively.

If the "Initialize" button is pressed, i.e., if the instruction for the processing for initializing the driving assist control is issued, in step S110, the hitching assist control unit 40 sets the learning flag FHK for distinguishing whether the image pattern of the hitch coupler 30B is already learned or not to zero indicating that this image pattern is not learned yet (FHK=0).

Subsequently, the hitching assist control unit 40 proceeds to step S111 and displays the following display content 111 on the information display 50.

Display Content 111: "The learning state has been initialized."

Further, the hitching assist control unit 40 proceeds to step S112, and sets the variable P_m to 1.

If detecting that the "Hitching Assist" button is pressed in step S109, the hitching assist control unit 40 proceeds to step S112 while skipping steps S110 and S111, and sets the variable P_m in the above-described manner.

After setting the variable P_m in step S112, the hitching assist control unit 40 proceeds to step S131 and performs various kinds of calculation processing prepared for the next occasion of execution of this routine, such as updating a previous value for use in a digital filter calculation, and then ends the present routine.

On the other hand, if detecting that the gear position of the vehicle 10 is the R range in the above-described step, step S105, the hitching assist control unit 40 proceeds to step S113.

In step S113, the hitching assist control unit 40 determines whether the image pattern (the shape) of the hitch coupler 30B is already learned based on the learning flag FHK.

The hitching assist control unit 40 determines that the image pattern of the hitch coupler 30B is not learned yet if the learning flag FHK is zero, and determines that the image pattern of the hitch coupler 30B is already learned if the learning flag FHK is 1.

If the learning flag FHK is zero and the image pattern of the hitch coupler 30B is not learned yet, the hitching assist control unit 40 proceeds to step S114.

In step S114, the hitching assist control unit 40 displays the following three display contents 114-1 to 114-3 on the information display 50.

Display Content 114-1: "The hitching assist is unusable because the learning of the hitching is not completed."

Display Content 114-2: "Move the vehicle to the hitch position by a manual operation."

Display Content 114-3: "Lock the gearshift at the P range after moving the vehicle to a hitchable position."

Presenting the above-described display allows the driver of the vehicle 10 to understand that the vehicle 10 is currently under such a situation that the hitching assist is unusable because the image pattern of the hitch coupler 30B is not learned yet and further understand that the driver should cause the image pattern of the hitch coupler 30B to be learned by performing the hitching operation (demonstrating it).

The display processing in the above-described step, step S114 is a function of issuing a notification prompting the driver of the vehicle 10 to manually hitch the vehicle 10 without the image pattern acquired yet (a second mode).

Subsequently, the hitching assist control unit 40 proceeds to step S115, and records the image behind the vehicle 10 that is captured by the rear camera 60. More specifically, the hitching assist control unit 40 records the image of the rear camera 60 in the course of the driver's manual hitching.

At this time, when recording the image of the rear camera 60, the hitching assist control unit 40 records the behavior information (the yaw rate, the pitch rate, and/or the like) of the vehicle 10 when the image is captured, in association with the image.

The hitching assist control unit 40 does not have to record all of the images captured by the rear camera 60 in step S115, and can save the memory capacity for recording the image captured by the rear camera 60 by recording the image, for example, per predetermined time or per predetermined running distance (for example, 1 m).

Further, the hitching assist control unit 40 proceeds to step S116 and sets the variable R_m to 1, and then proceeds to step S131.

If the gear position of the vehicle 10 is the P range when the present routine is performed again after the variable R_m is set in step S116, the hitching assist control unit 40 proceeds from step S105 to step S106 and determines that R_m=1 and P_m=1 there, and then proceeds to step S117.

In step S117, the hitching assist control unit 40 determines whether the hitch ball 30A is hidden from the image of the rear camera 60 that has been acquired in step S103 in the present execution of the routine.

The rear camera 60 is set in such a manner that the hitch ball 30A is displayed on the screen of the rear camera 60. However, when the hitch ball 30A and the hitch coupler 30B are connected to each other, the hitch ball 30A is supposed to be hidden under the hitch coupler 30B as the hitch coupler 30B covers the hitch ball 30A.

Therefore, when the hitch ball 30A is hidden from the image, the hitching assist control unit 40 can estimate that the hitch coupler 30B is manually connected to the hitch ball 30A and, further, that the hitch coupler 30B is displayed in the region where the hitch ball 30A has been displayed.

In other words, the hitching assist control unit 40 can determine based on the image of the rear camera 60 that the hitch ball 30A and the hitch coupler 30B are connected to each other and the image region of the hitch coupler 30B is identified, and the hitching assist control unit 40 is now ready to learn the image pattern of the hitch coupler 30B.

Therefore, when the hitch ball 30A and the hitch coupler 30B are connected to each other, the driver does not have to make the hitching assist control unit 40 aware of it by, for example, operating a button, thereby being less burdened by the operation load.

If the hitch ball 30A is displayed in the image of the rear camera 60, i.e., the hitch ball 30A and the hitch coupler 30B are separated from each other, the hitching assist control unit 40 proceeds to step S131 because not reaching a learnable state yet.

On the other hand, when the hitch ball 30A is hidden from the image of the rear camera 60 with the manual connection completed between the hitch ball 30A and the hitch coupler 30B, and the hitching assist control unit 40 becomes ready to perform the processing for learning the image pattern of the hitch coupler 30B, the hitching assist control unit 40 proceeds to step S118 and starts the learning processing.

As described above, the hitch ball 30A hidden from the image of the rear camera 60 in the course of the manual hitching indicates that the manual connection is completed between the hitch ball 30A and the hitch coupler 30B, and further indicates that the hitch coupler 30B is displayed in the image of the rear camera 60 so as to cover and hide the hitch ball 30A.

Therefore, in step S118, the hitching assist control unit 40 performs the processing for learning the image pattern, which extracts the image region (the shape) of the hitch coupler 30B from the image recorded during the manual hitching based on the position of the hitch ball 30A in the image of the rear camera 60, and records this image region into the memory as the image pattern of the hitch coupler 30B.

After that, the hitching assist control unit 40 repeats processing that dates back from the last image toward the first image among the images of the rear camera 60 that have been recorded in the course of the hitching by the driver's operation (in the course of the manual hitching) and extracts a region shaped similarly to the image region of the hitch coupler 30B extracted in the immediately preceding image from the present image as the image region of the hitch coupler 30B, thereby learning (recording) the image pattern (the image region) of the hitch coupler 30B for each of a plurality of conditions corresponding to different distances from the vehicle 10.

In other words, the hitching assist control unit 40 repeats processing that searches for the hitch coupler 30B to newly acquire the image pattern thereof from the image that the hitching assist control unit 40 temporally dates back to based on the acquired image pattern of the hitch coupler 30B, starting from the image when the hitch ball 30A is hidden, thereby acquiring the image patterns under the plurality of conditions corresponding to the different distances from the rear camera 60 to the hitch coupler 30B.

In this manner, when the driver moves back the vehicle 10 by steering it and hitches the vehicle 10 and the trailer 20, the hitching assist control unit 40 records the image acquired by the rear camera 60 until the hitch is completed, and acquires the image pattern of the hitch coupler 30B from the recorded image.

Then, the hitching assist control unit 40 can determine whether to learn the image pattern or cancel the learning based on the behavior information (the yaw rate, the pitch rate, and/or the like) of the vehicle 10 that is recorded together with the image of the rear camera 60.

More specifically, when a change in the behavior of the vehicle 10 is larger than a predetermined level (the yaw rate and/or the pitch rate is(are) higher than the setting), this leads to a reduction in the image quality of the rear camera 60 such as occurrence of a blur in the image, thereby making it impossible for the hitching assist control unit 40 to accurately learn the image pattern of the hitch coupler 30B.

Therefore, the hitching assist control unit 40 cancels the learning if the change in the behavior of the vehicle 10 is larger than the predetermined level when recording the image of the rear camera 60, while learning the image pattern based on the high-quality image captured when the change in the behavior of the vehicle 10 is smaller than the predetermined level, thereby preventing the reduction in the accuracy of the learned data of the image pattern.

The processing for learning the image pattern in the above-described step, step S118 does not require the driver to select the image region of the hitch coupler 30B by, for example, operating the touch panel, thereby reducing the operation load on the driver.

Further, this processing sequentially learns the image pattern at a position farther away from the vehicle 10 by repeating the processing that searches for the region of the hitch coupler 30B based on the extracted region in the immediately preceding image, starting from the image when the hitch ball 30A is hidden (when the connection is completed), thereby being able to highly accurately and collectively learn the image pattern of the hitch coupler 30B for each of the conditions corresponding to the different distances from the vehicle 10 based on the hitching manually demonstrated only once.

Subsequently, the hitching assist control unit 40 proceeds to step S119, and determines whether or not the image pattern of the hitch coupler 30B can be learned for each of the conditions corresponding to the different distances from the vehicle 10, i.e., whether the learning of the image pattern is completed.

Then, if the learning of the image pattern is completed, the hitching assist control unit 40 proceeds to step S120, and sets the learning flag FHK to 1 indicating that the image pattern is already learned (FHK=1).

Further, after displaying the following display content 121 on the information display 50 in the next step, step S121, the hitching assist control unit 40 proceeds to step S131.

Display Content 121: "The learning is completed. The hitching assist is usable from the next time."

In other words, the hitching assist control unit 40 makes the driver aware that the hitching assist control unit 40 has completed the learning of the image pattern of the hitch coupler 30B and is now ready to execute the hitching assist based on the detection of the position of the hitch coupler 30B with use of the image pattern due to the display content 121.

On the other hand, if the learning of the image pattern is not completed yet, the hitching assist control unit 40 proceeds to step S122 and displays the following display contents 122-1 and 122-2 on the information display 50, and then proceeds to step S131 after that.

Display Content 122-1: "Because the learning has failed, the assist is still unusable next time."

Display Content 122-2: "Try relearning after changing the sunshine condition or while moving back the vehicle with a milder operation".

As a reason for the failure in completing the learning, possible examples thereof include the image captured with reduced sensitivity due to low illuminance, occurrence of a blur in the image due to a sharp behavior of the vehicle 10, and the like. Therefore, notifying the driver of the above-described display contents can prompt the driver to perform the manual hitching operation under a further suitable condition, thereby guiding the driver to the completion of the learning.

In other words, when failing to acquire the image pattern of the hitch coupler 30B, the hitching assist control unit 40 issues a notification prompting the driver of the vehicle 10 to change the condition of the manual hitching by displaying the above-descried display content 122-2 on the information display 50.

When proceeding to step S113 after completing the learning of the image pattern of the hitch coupler 30B, the hitching assist control unit 40 determines that the image pattern is already learned (already acquired) and performs substitution processing of the variable R_m=P_m, and then proceeds to step S123.

In step S123, the hitching assist control unit 40 determines which value the variable R_m has, 0, 1, or 2.

If the variable R_m is 0 at this time, the hitching assist control unit 40 proceeds to step S131.

The variable R_m is set to R_m=2 upon the generation of the target trajectory for moving the vehicle 10 toward the position for the hitch to the trailer 20, and indicates that the target trajectory is not generated when being in a state of R_m=1.

Therefore, when R_m=1, the hitching assist control unit 40 proceeds to step S124 and steps subsequent thereto and performs processing for generating the target trajectory.

First, in step S124, the hitching assist control unit 40 extracts the trailer 20 from inside the image of the rear camera 60. More specifically, the hitching assist control unit 40 extracts a combination of two opposing vertical edges and horizontal edges between these vertical edges as the trailer 20.

Then, when being able to detect one pair of vertical edges and the horizontal edges between them, the hitching assist control unit 40 detects a region most highly correlated to the image pattern of the hitch coupler 30B from the image region between the one pair of vertical edges as the image region of the hitch coupler 30B based on pattern matching using the learned image pattern of the hitch coupler 30B, and calculates the position and the angle of the hitch coupler 30B.

Subsequently, the hitching assist control unit 40 proceeds to step S125 and generates the target trajectory for moving back the vehicle 10 (the subject vehicle) to the trailer 20.

At this time, the hitching assist control unit 40 identifies the position of the subject vehicle and the angle of the subject vehicle in a coordinate system with the origin thereof placed at the position of the hitch coupler 30B, and generates the target trajectory for moving back the vehicle 10 to position the hitch ball 30A closer to the hitch coupler 30B.

Further, in the generation of the target trajectory, the hitching assist control unit 40 defines the hitch ball 30A as a starting point and the hitch coupler 30B as an end point and further sets a midpoint based on, for example, the relative relationship between the longitudinal axis of the subject vehicle and the longitudinal axis of the trailer, calculates interpolation points between these control points with use of a B-spline curve, and extracts the interpolation points, thereby generating the target trajectory.

The generation of the target trajectory by the hitching assist control unit 40 will be described in detail below.

After generating the target trajectory, the hitching assist control unit 40 proceeds to step S126 and sets the variable R_m indicating the R-range state to 2. After that, the hitching assist control unit 40 proceeds to step S131.

Due to this setting, when proceeding to step S123 next time or after that, the hitching assist control unit 40 determines that R_m=2 and proceeds to step S127.

In step S127, the hitching assist control unit 40 calculates a target lateral acceleration Gy for following the target trajectory based on the slip angle $\beta$, the vehicle speed V, and the like of the vehicle 10.

Subsequently, in step S128, the hitching assist control unit 40 calculates a steering instruction based on the target lateral acceleration Gy, and outputs the signal of the target steering angle (the steering angle instruction) to the steering control unit 14, which controls the electric power steering apparatus 13.

Further, the hitching assist control unit 40 updates the position of the subject vehicle in step S129, and, further updates the position of the hitch ball 30A in step S130.

The processing for calculating the steering angle instruction and updating the position of the subject vehicle and the position of the hitch ball 30A by the hitching assist control unit 40 will be described in detail below.

In this manner, without the image pattern of the hitch coupler 30B learned yet, the hitching assist control unit 40 prompts the driver of the vehicle 10 to manually demonstrate the hitching, and learns the image pattern (the shape) of the hitch coupler 30B based on the image of the rear camera 60 that is acquired when the hitching is manually demonstrated.

Then, once learning the image pattern of the hitch coupler 30B, the hitching assist control unit 40 becomes ready to execute the hitching assist, and execute the hitching assist when the assist request is issued from the driver.

During the hitching assist, the hitching assist control unit 40 perceives the hitch coupler 30B from the image of the rear camera 60 based on the learned image pattern of the hitch coupler 30B, and controls the steering angles of the front wheels 11, 11 so as to move back the vehicle 10 toward the perceived hitch coupler 30B.

Therefore, the vehicle 10 is highly accurately moved back as far as the position at which the hitch ball 30A is connected to the hitch coupler 30B under the steering control by the hitching assist control unit 40, and allows the driver to easily hitch the vehicle 10 and the trailer 20 even when there is the driver alone.

In the following description, the processing for generating the target trajectory (step S125) and the processing for generating the steering angle instruction (step S128), which are performed by the hitching assist control unit 40, will be described in detail.

Figure 8:
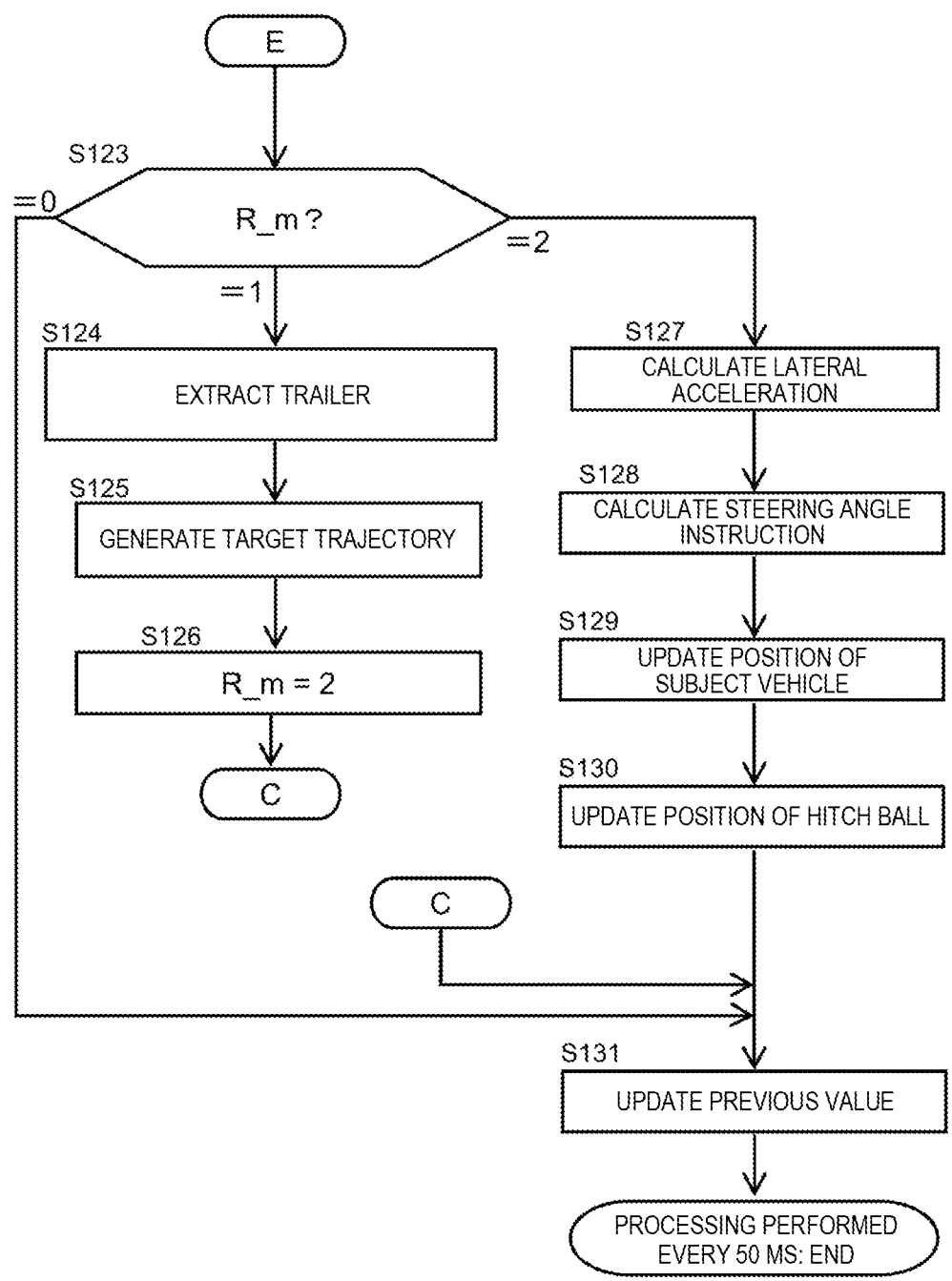
FIG. 8 is a flowchart illustrating the procedure for the hitching assist.

Processing in steps S123 to S128 illustrated in FIG. 8 is, in summary, a function of detecting the position of the hitch coupler 30B from the image of the rear camera 60 based on the pre-acquired image pattern of the hitch coupler 30B, and outputting the steering instruction for assisting in the hitching between the vehicle 10 and the trailer 20, i.e., the steering instruction for moving the hitch ball 30A of the vehicle 10 toward the hitch coupler 30B of the trailer 20 based on the detected position of the hitch coupler 30B to the steering control unit 14 (the steering controller) (a first mode).

Figure 9:
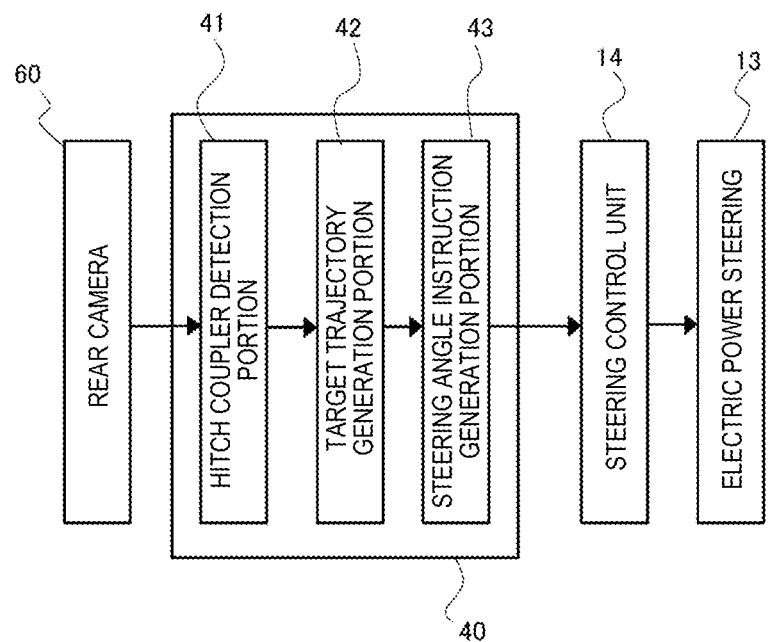
FIG. 9 is a block diagram of a steering control system as the hitching assist.

FIG. 9 is a block diagram of a system that controls the steering as the hitching assist.

In the hitching assist system illustrated in FIG. 9, the rear camera 60 outputs the signal of the captured image to the hitching assist control unit 40.

The hitching assist control unit 40 includes functions as a hitch coupler detection portion 41, a target trajectory generation portion 42, and a steering angle instruction generation portion 43 in the form of software.

The hitch coupler detection portion 41 perceives the hitch coupler 30B based on a comparison between the pre-learned image pattern of the hitch coupler 30B and the image of the rear camera 60 to identify the position and the angle of the hitch coupler 30B, and outputs information about the identified position and angle of the hitch coupler 30B to the target trajectory generation portion 42.

The target trajectory generation portion 42 generates the target trajectory of the subject vehicle for connecting the hitch ball 30A of the subject vehicle to the hitch coupler 30B of the trailer 20 based on, for example, the information about the position and the angle of the hitch coupler 30B, and outputs information about the target trajectory to the steering angle instruction generation portion 43.

The steering angle instruction generation portion 43 determines the steering angle instruction for causing the subject vehicle to follow the target trajectory, i.e., the steering instruction for assisting in the hitching between the vehicle 10 and the trailer 20, and outputs the determined steering angle instruction (the steering instruction) to the steering control unit 14 (the steering controller), which controls the electric power steering apparatus 13.

In the following description, the processing for generating the target trajectory by the target trajectory generation portion 42 will be described in detail.

Figure 10:
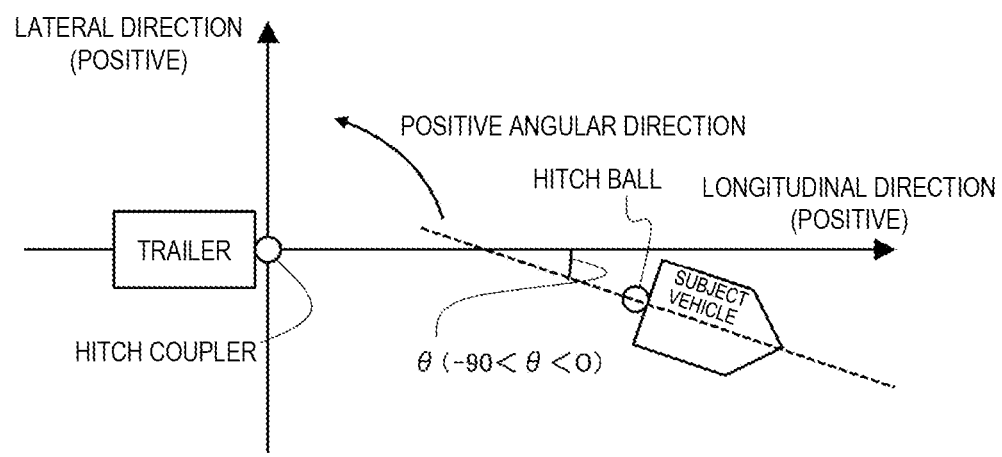
FIG. 10 illustrates a coordinate system with the origin thereof placed at a hitch coupler.

FIG. 10 illustrates how to establish a coordinate system of the target trajectory.

The target trajectory generation portion 42 sets an orthogonal coordinate system with the origin thereof placed at the position of the hitch coupler 30B of the trailer 20 and the coordinate axes thereof laid on the longitudinal direction of the trailer 20 (the X axis) and the lateral direction of the trailer 20 (the Y axis), respectively.

In the above-described coordinate system, the angle is expressed in such a manner that an angle toward the positive direction of the Y axis is expressed as a positive angle and an angle toward the negative direction of the Y axis is expressed as a negative angle, assuming that the positive direction of the X axis corresponds to 0 degrees.

Therefore, in the case of the vehicle position illustrated in FIG. 10, an angle $\theta$ of the longitudinal axis of the vehicle 10 is expressed as a negative value ($-90$ degrees$<\theta<0$).

Figure 11:
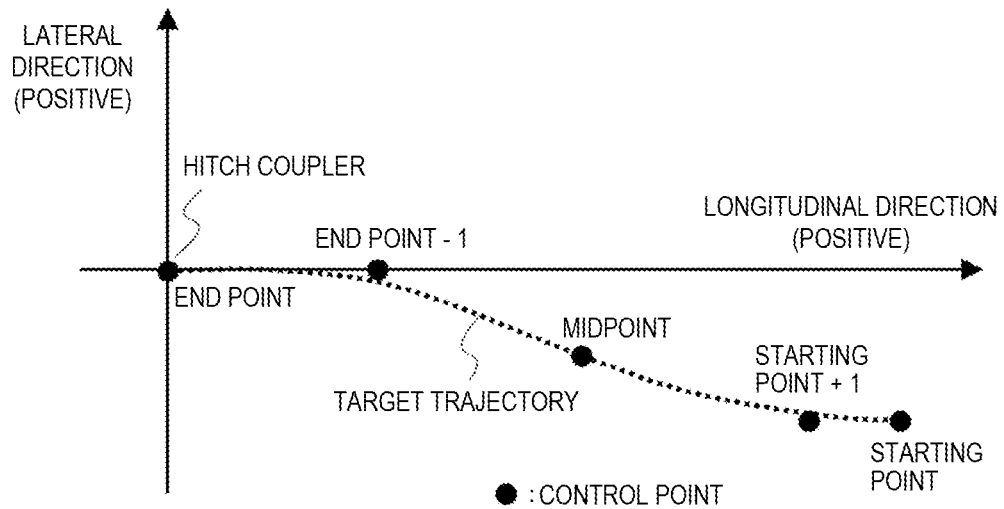
FIG. 11 illustrates a target trajectory in the hitching assist.

FIG. 11 illustrates the outline of the processing for generating the target trajectory.

Upon receiving the result of the perception (the position and the angle) of the hitch coupler 30B from the hitch coupler detection portion 41, the target trajectory generation portion 42 sets the coordinate system with the origin thereof placed at the position of the hitch coupler 30B (refer to FIG. 10), and starts expressing the position and the angle of the subject vehicle in this coordinate system.

Next, the target trajectory generation portion 42 sets a plurality of control points of the B-spline curve for defining the shape of the target trajectory, and calculates interpolation points between the control points according to the B-spline curve.

The target trajectory generation portion 42 sets a position shifted forward from the hitch coupler 30B by a predetermined distance in the direction of the longitudinal axis of the trailer 20 (the end point−1) and a position shifted backward from the hitch ball 30A by a predetermined distance in the direction of the longitudinal axis of the vehicle 10 (the starting point+1), and, further, the midpoint, which is the intermediate position between the "end point−1" and the "starting point+1", in addition to the position of the hitch ball 30A, which is the starting point, and the position of the hitch coupler 30B, which is the end point, as the control points.

Then, the target trajectory generation portion 42 extracts the interpolation points at equal-distance intervals, thereby generating the target trajectory formed by the extracted interpolation points.

Now, the input information for the generation of the target trajectory will be described.

Figure 12:
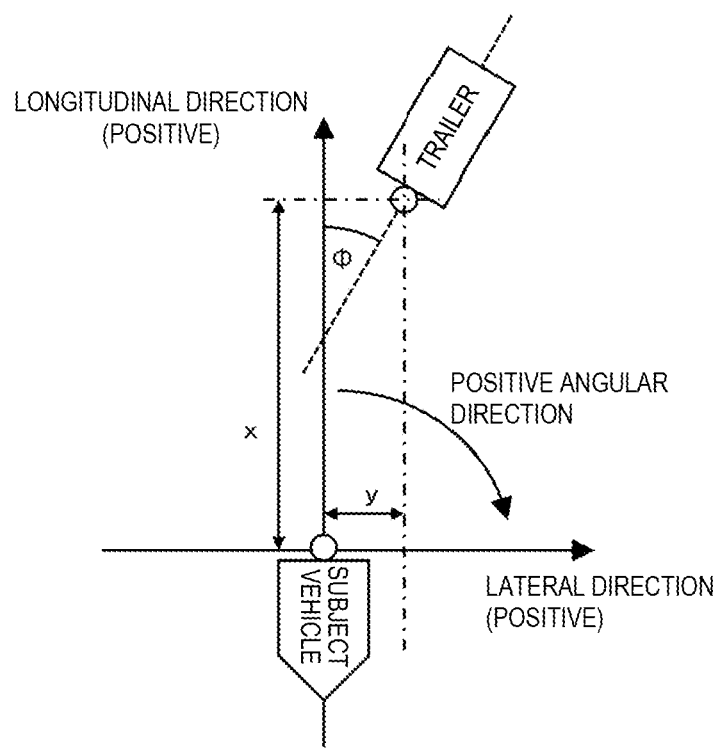
FIG. 12 illustrates a coordinate system with the origin thereof placed at a hitch ball.

The hitch coupler detection portion 41 expresses the position of the hitch coupler 30B (x, y) in an orthogonal coordinate system with the origin thereof placed at the position of the hitch ball 30A and the coordinate axes thereof laid on the longitudinal direction of the vehicle 10 (the X axis) and the lateral direction of the vehicle 10 (the Y axis), respectively, as illustrated in FIG. 12.

Further, the hitch coupler detection portion 41 expresses an angle Φ of the trailer 20 so as to express an angle toward the positive direction of the Y axis as a positive angle and an angle toward the negative direction of the Y axis as a negative angle, assuming that the positive direction of the X axis corresponds to 0 degrees, similarly to the coordinate system of the target trajectory.

Then, the hitch coupler detection portion 41 outputs information about the position of the hitch coupler 30B (x, y) and the angle Φ of the trailer 20 (Φ>0 in FIG. 12) in the coordinate system with the origin thereof placed at the position of the hitch ball 30A illustrated in FIG. 12 to the target trajectory generation portion 42.

Because the coordinate system is established in a different manner from the hitch coupler detection portion 41, the target trajectory generation portion 42 performs processing for converting the positional information so as to express the position of the hitch coupler 30A (X, Y) in the coordinate system with the origin thereof placed at the position of the hitch coupler 30B.

In the above-described conversion processing, the target trajectory generation portion 42 performs different conversion processing according to the positional relationship between the vehicle 10 and the trailer 20.

Figure 13:
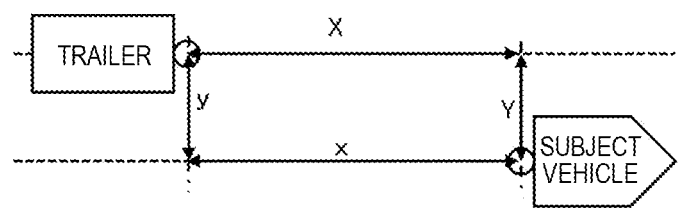
FIG. 13 illustrates a case 1 of coordinate conversion processing.

FIG. 13 (a case 1) is a case in which there is no intersection point between the longitudinal axis of the trailer 20 and the longitudinal axis of the vehicle 10, i.e., a case in which the longitudinal axis of the trailer 20 and the longitudinal axis of the vehicle 10 extend in parallel with each other at some interval, and the angle Φ (rad) of the longitudinal axis of the trailer 20 is zero.

In this case, when the position of the hitch coupler 30B in the coordinate system with the origin thereof placed at the position of the hitch ball 30A is expressed as (x, y), the position of the hitch ball 30A (X, Y) in the coordinate system with the origin thereof placed at the position of the hitch coupler 30B is converted into (X=x, Y=y), as illustrated in FIG. 13.

Figure 14:
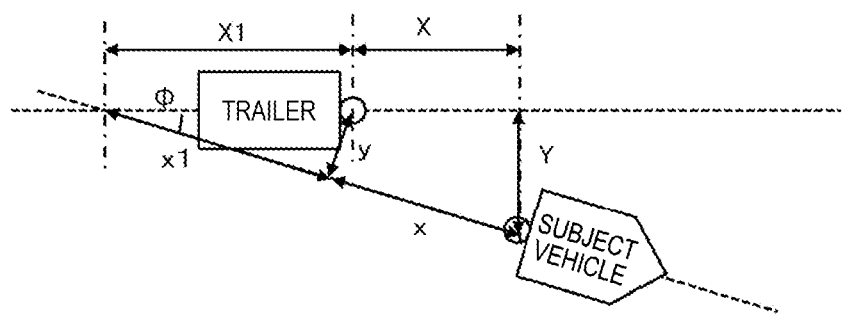
FIG. 14 illustrates a case 2 of the coordinate conversion processing.

FIG. 14 (a case 2) is a case in which there is an intersection point between the longitudinal axis of the trailer 20 and the longitudinal axis of the vehicle 10 beyond (behind) the trailer 20.

In this case, assuming that x1 represents the distance (m) from the hitch coupler 30B to the intersection point along the longitudinal axis of the vehicle 10 and X1 represents the distance (m) from the hitch coupler 30B to the intersection point along the longitudinal axis of the trailer 20, the following equations are established.

$y/x1 = \tan \Phi$ $y/X1 = \sin \Phi$ $(X+X1)/(x+x1) = \cos \Phi$

Therefore, when the position of the hitch coupler 30B in the coordinate system with the origin thereof placed at the position of the hitch ball 30A is (x, y), the position of the hitch ball 30A (X, Y) is converted into (X=x cos Φ−y sin Φ, Y=x sin Φ+y cos Φ) in the coordinate system with the origin thereof placed at the position of the hitch coupler 30B.

Figure 15:
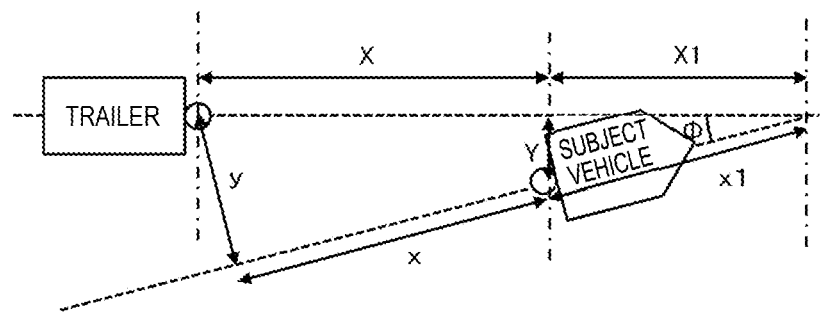
FIG. 15 illustrates a case 3 of the coordinate conversion processing.

FIG. 15 (a case 3) is a case in which there is an intersection point between the longitudinal axis of the trailer 20 and the longitudinal axis of the vehicle 10 in front of the vehicle 10.

In this case, assuming that x1 represents the distance from the hitch ball 30A to the intersection point along the longitudinal axis of the vehicle 10 and X1 represents the distance from the hitch ball 30A to the intersection point along the longitudinal axis of the trailer 20, the following equations are established.

$y/(x+x1) = \tan \Phi$ $X1/x1 = \cos \Phi$ $(x+x1)/(X+X1) = \cos \Phi$

Therefore, when the position of the hitch coupler 30B in the coordinate system with the origin thereof placed at the position of the hitch ball 30A is (x, y), the position of the hitch ball 30A (X, Y) is converted into (X=x cos Φ+y sin Φ, Y=−x sin Φ+y cos Φ) in the coordinate system with the origin thereof placed at the position of the hitch coupler 30B.

Figure 16:
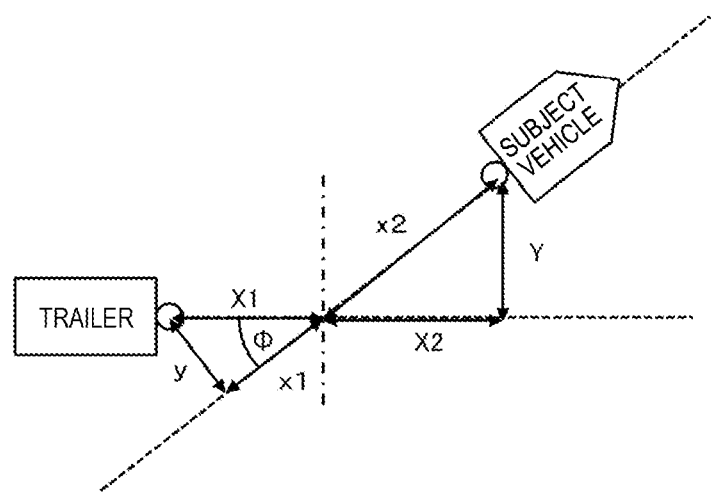
FIG. 16 illustrates a case 4 of the coordinate conversion processing.

FIG. 16 (a case 4) is a case in which there is an intersection point between the longitudinal axis of the trailer 20 and the longitudinal axis of the vehicle 10 within the longitudinal position x.

In this case, assuming that x2 represents the distance from the hitch ball 30A to the intersection point along the longitudinal axis of the vehicle 10, x1 represents the distance from the intersection point to the hitch coupler 30B along the longitudinal axis of the vehicle 10, X1 represents the distance (m) from the hitch coupler 30B to the intersection point along the longitudinal axis of the trailer 20, and X2 represents the distance (m) from the intersection point to the hitch ball 30A along the longitudinal axis of the trailer 20, the following equations are established.

$y/x1 = \tan \Phi$ $x2 = x - x1$ $y/X1 = \sin \Phi$ $Y/X2 = \tan \Phi$

Therefore, when the position of the hitch coupler 30B in the coordinate system with the origin thereof placed at the position of the hitch ball 30A is (x, y), the position of the hitch ball 30A (X, Y) is converted into (X=x cos Φ+y sin Φ, Y=x sin Φ−y cos Φ) in the coordinate system with the origin thereof placed at the position of the hitch coupler 30B.

The target trajectory generation portion 42 identifies the position of the hitch ball 30A (X, Y) in the coordinate system with the origin thereof placed at the position of the hitch coupler 30B in this manner.

Figure 17:
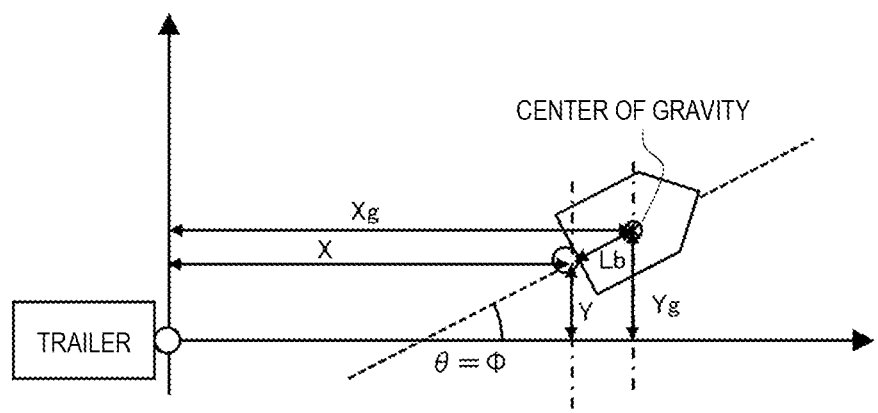
FIG. 17 illustrates processing for determining the center of gravity of the vehicle based on the position of the hitch ball.

Subsequently, the target trajectory generation portion 42 identifies the position of the center of gravity (Xg, Yg) of the vehicle 10 in the coordinate system with the origin thereof placed at the position of the hitch coupler 30B (refer to FIG. 17).

At this time, because the vehicle 10 has the yaw angle θ (rad) of θ=Φ, the target trajectory generation portion 42 calculates the position of the center of gravity (Xg, Yg) according to the following equations, assuming that Lb represents the distance (m) from the center of gravity of the vehicle to the hitch ball 30A.

$$Xg = X + Lb \cdot \cos\theta$$

$$Yg = Y + Lb \cdot \sin\theta$$

Next, the setting of the control points of the B-spline curve will be described.

The target trajectory generation portion 42 sets the following first to fifth control points (the starting point to the end point) as the control points of the B-spline curve.
- the first control point (the starting point): the position of the center of gravity of the vehicle 10
- the second control point (the starting point+1): a position shifted backward from the position of the center of gravity of the vehicle 10 by a predetermined distance (for example, 2 m) along the direction of the longitudinal axis of the vehicle 10
- the third control point (the midpoint): the intersection point or the central point between the longitudinal axis of the vehicle 10 and the longitudinal axis of the trailer 20
- the fourth control point (the end point−1): a position shifted forward from the hitch coupler 30B by a predetermined distance (for example, 3.5 m) along the direction of the longitudinal axis of the trailer 20
- the fifth control point (the end point): the position of the hitch coupler 30B At this time, the target trajectory generation portion 42 selects any one of the intersection point and the central point between the longitudinal axis of the vehicle 10 and the longitudinal axis of the trailer 20 as the third control point (the midpoint) in the following manner.

Figure 18:
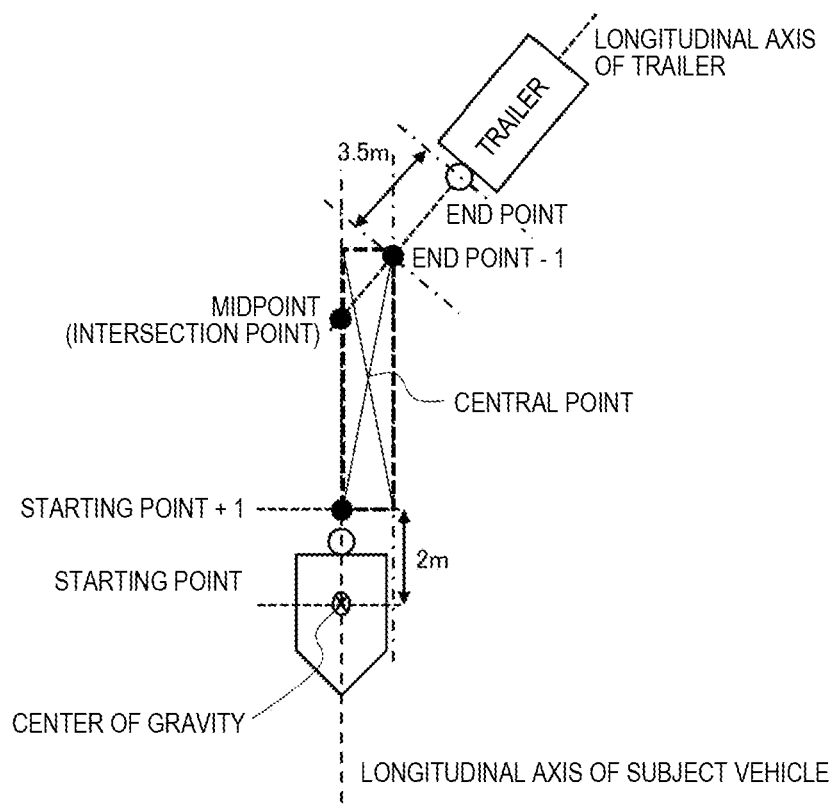
FIG. 18 illustrates how to set a midpoint as a control point of a B-spline.
Figure 19:
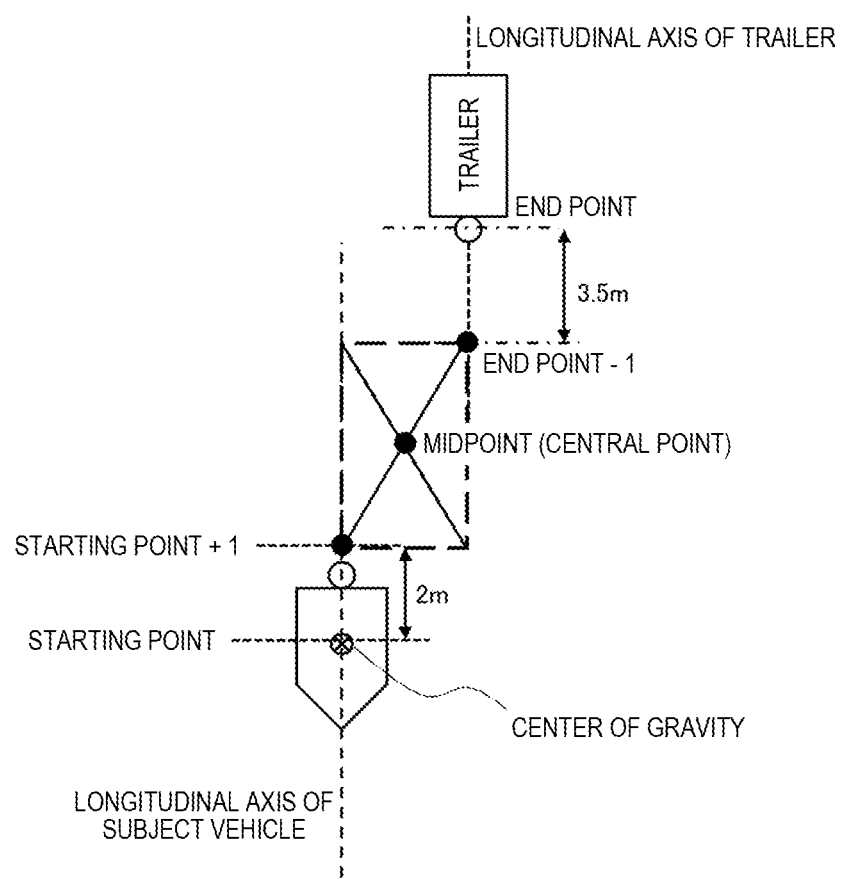
FIG. 19 illustrates how to set the midpoint as the control point of the B-spline.

The central point refers to an intersection point between diagonal lines of a rectangle having a diagonal line that is a line connecting the second control point (the starting point+1), which is set at the position shifted backward from the position of the center of gravity of the vehicle 10 by the predetermined distance in the direction of the longitudinal axis of the vehicle 10, and the fourth control point (the end point−1), which is set at the position shifted forward from the hitch coupler 30B by the predetermined distance in the direction of the longitudinal axis of the trailer 20, as illustrated in FIGS. 18 and 19.

The target trajectory generation portion 42 selects the intersection point as the third control point (the midpoint) if the intersection point between the longitudinal axis of the vehicle 10 and the longitudinal axis of the trailer 20 is contained in the above-described rectangle as illustrated in FIG. 18.

On the other hand, the target trajectory generation portion 42 selects the central point, which is the intersection point between the diagonal lines of the rectangle, as the third control point (the midpoint) if the intersection point between the longitudinal axis of the vehicle 10 and the longitudinal axis of the trailer 20 is not contained in the above-described rectangle as illustrated in FIG. 19.

The B-spline curve does not necessarily pass through the control points, but has to pass through the starting point and the end point in the generation of the target trajectory by the target trajectory generation portion 42.

Therefore, the target trajectory generation portion 42 allows the B-spline curve to pass through the starting point and the end point by setting the control point next to the starting point (the second control point or the starting point+1) at the position shifted backward from the position of the center of gravity, which is the starting point, by the predetermined distance along the direction of the longitudinal axis of the vehicle 10, and also setting the control point immediately before the end point (the fourth control point or the end point−1) at the position shifted forward from the hitch coupler 30B as the end point by the predetermined distance along the direction of the longitudinal axis of the trailer 20.

Next, the definition of the B-spline curve will be described now.

A B-spline curve of order n including one segment is formed by n+1 control points {P0, P1, . . . , Pn}, and a B-spline function of order n including L segments is defined by an equation 1.

$$P(t) = \sum_{i=0}^{n+L-1} P_i N_i^n(t) \quad \text{[Equation 1]}$$

The range in which the parameter t changes is tn to tn+L.

A quadratic basis function $N_0^2(t)$ of a uniform quadratic B-spline curve is defined by an equation 2.

$$N_0^2(t) = \begin{cases} \frac{1}{2}t^2 & t \in [0, 1] \\ -t^2 + 3t - \frac{3}{2} & t \in [1, 2] \\ \frac{1}{2}(t-3)^2 & t \in [2, 3] \\ 0 & t \in [0, 3] \end{cases} \quad \text{[Equation 2]}$$

Another quadratic basis function $N_i^2(t)$ is acquired by translating $N_0^2(t)$ by i in the positive direction of the t axis.

Now, the interval between the interpolation points according to the B-spline curve depends on the interval between the control points and a step size dt of the parameter t, and the interval between the interpolation points cannot be known before the calculation.

Therefore, the step size dt of the parameter t is preset so as to allow the interpolation points to be calculated at sufficiently short intervals according to the requirement of the target trajectory even when the interval between the control points is different.

In the present embodiment, the target trajectory is generated by extracting the interpolation points according to the B-spline curve at intervals of 0.1 m in terms of the longitudinal position. This necessitates the step size dt that keeps the maximum interval between the interpolation points shorter than 0.1 m even when the interval between the control points is different, and the step size dt is determined to be 0.01 as a value satisfying this requirement.

After calculating the interpolation points according to the B-spline curve, the target trajectory generation portion 42 generates the target trajectory as exemplarily illustrated in FIG. 11 by extracting the interpolation points at intervals of 0.1 m in terms of the longitudinal position.

However, because there are no interpolation points located at equal-distance intervals, the target trajectory generation portion 42 acquires the interpolation points at equal-distance intervals by conducting linear interpolation between interpolation points preceding and subsequent to the position at the equal-distance interval.

Next, the function of the steering angle instruction generation portion 43 illustrated in FIG. 9 will be described in detail.

Figure 20:
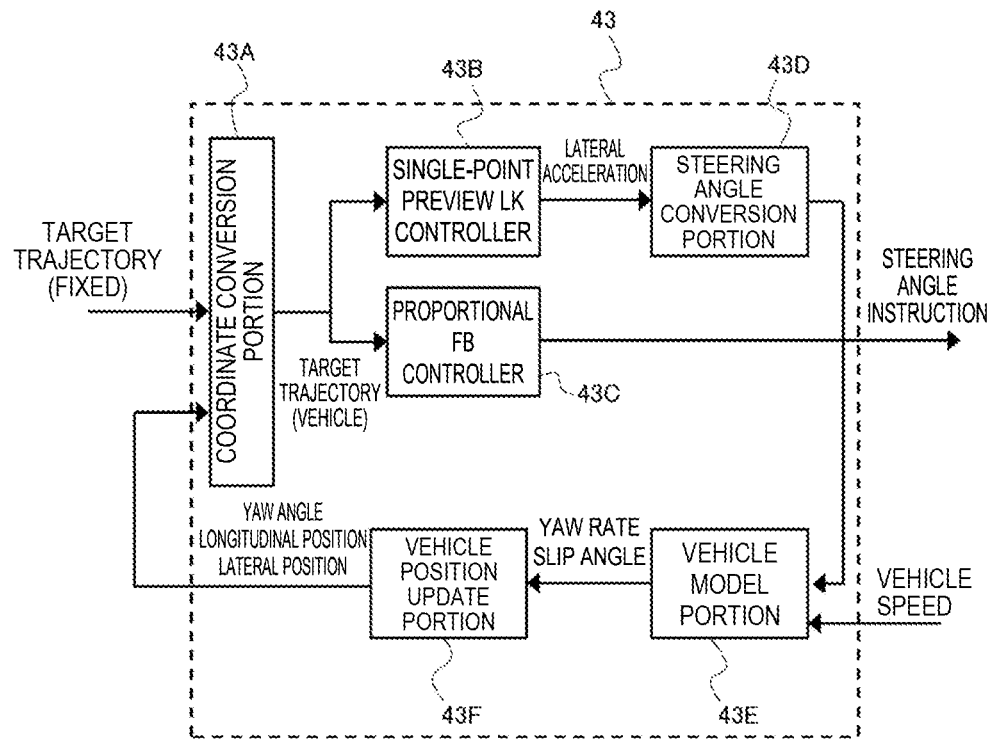
FIG. 20 is a functional block diagram of generation of a steering angle instruction.

FIG. 20 is a functional block diagram of the steering angle instruction generation portion 43.

The steering angle instruction generation portion 43 includes a coordinate conversion portion 43A, a single-point preview LK controller 43B, a proportional FB controller 43C, a steering angle conversion portion 43D, a vehicle model portion 43E, and a vehicle position update portion 43F.

The single-point preview LK controller 43B calculates the lateral acceleration for causing the vehicle 10 to follow the target trajectory.

Figure 21:
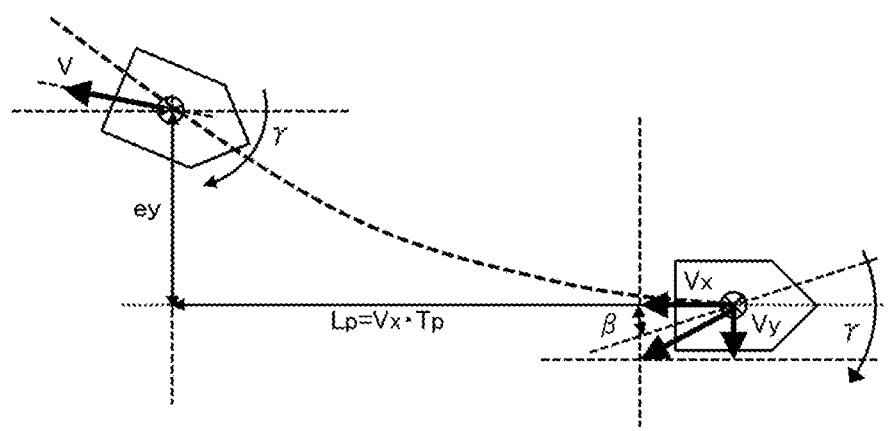
FIG. 21 illustrates processing for calculating a lateral acceleration.

The single-point preview LK controller 43B calculates the lateral acceleration Gy required when the vehicle 10 moves back and runs by a distance Lp (m) in the longitudinal direction (the front-rear direction) and is further displaced laterally by a distance ey (m) as illustrated in FIG. 21, hypothetically supposing that the vehicle 10 corners in a steady state with the vehicle speed V (m/s) and the front-wheel tire steering angle δ (rad) kept constant.

Now, a vehicle longitudinal speed Vx (m/s) and a vehicle lateral speed Vy (m/s) when the vehicle 10 moves back are acquired as the vehicle longitudinal speed Vx=V·cos β and the vehicle lateral speed Vy=V·sin β, respectively, based on the vehicle speed V and the slip angle β (rad).

On the other hand, a preview time Tp (s) is acquired as Tp=Lp/Vx based on the vehicle longitudinal speed Vx and the distance Lp.

Further, the lateral displacement ey is acquired as the lateral displacement ey=Vy·Tp+½·Gy·Tp2 based on the vehicle lateral speed Vy, the preview time Tp, and the lateral acceleration Gy.

This means that the lateral acceleration Gy is acquired as the lateral acceleration Gy={2(ey−Vy·Tp)}/Tp2.

The single-point preview LK controller 43B calculates the lateral acceleration Gy by assuming that the preview distance is constant and setting the lateral displacement ey based on the target trajectory.

Then, the single-point preview LK controller 43B causes the vehicle 10 to follow the target trajectory by setting the lateral acceleration Gy for each control cycle.

An increase in the preview distance Lp leads to a reduction in the lateral displacement at the position of the hitch coupler 30B but an excessive increase in the preview distance Lp causes an overshoot, and therefore the preview distance Lp is adapted based on the convergence to the position of the hitch coupler 30B. In the present embodiment, the preview distance Lp is set to 4.0 m based on the result of a simulation.

The steering angle conversion portion 43D calculates a steering-wheel steering angle δh based on the lateral acceleration Gy with use of a calculation equation of steady-state cornering in a two-wheeled model.

The yaw rate γ (rad/s) is calculated according to an equation 3 based on a wheelbase Lw (m) of the vehicle 10, a stability factor A (s²/m²) of the vehicle 10, the vehicle speed V (m/s), and the front-wheel tire steering angle δ (rad).

$$\gamma = \frac{1}{1+AV^2}\frac{V}{Lw}\delta \qquad \text{[Equation 3]}$$

Further, because of the lateral acceleration Gy=V·γ and γ=Gy/V, the front-wheel tire steering angle δ is calculated according to an equation 4.

$$\delta = \frac{(1+AV^2)Lw}{V^2}Gy \qquad \text{[Equation 4]}$$

Then, assuming that Gr represents an overall gear ratio, the steering-wheel steering angle δh is acquired as δh=Gr·δ based on the front-wheel tire steering angle δ and the overall gear ratio Gr.

The vehicle model portion 43E calculates the slip angle β and the yaw rate γ according to the two-wheeled model.

Figure 22:
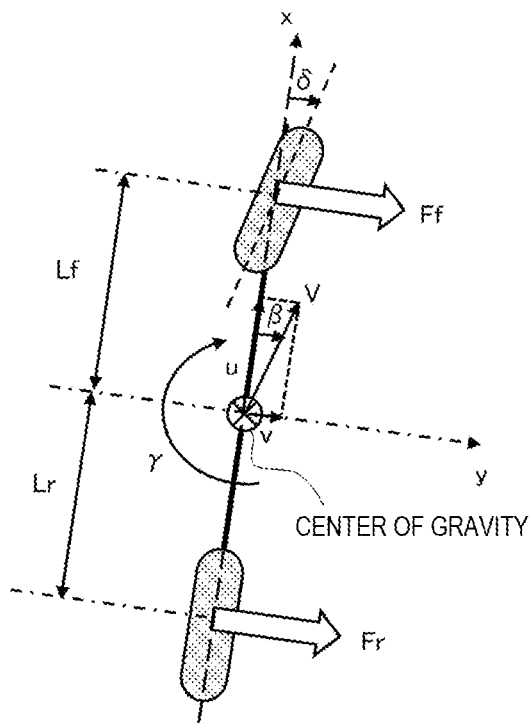
FIG. 22 illustrates processing for calculating a slip angle and a yaw rate based on a two-wheeled model.

In a state that the vehicle 10 moves forward illustrated in FIG. 22, "the mass×the lateral acceleration=the lateral external force" and "the inertial moment × the angular speed=the moment around the center of gravity due to the external force" are established.

Therefore, an equation of motion when the vehicle 10 moves forward is expressed as an equation 5, assuming that m represents the inertial mass.

$$m(\dot{v}+u\gamma)=F_f+F_r$$

$$I\dot{\gamma}=l_fF_f-l_rF_r \qquad \text{[Equation 5]}$$

Now, focusing on a motion in a range where the slip angle β of the vehicle body is small when the vehicle 10 moves back, the following relationships are established because the direction of the lateral speed when the vehicle 10 moves back has an opposite sign from when the vehicle 10 moves forward.

$$u \approx V$$

$$v=-V\sin\beta \approx -V\beta$$

Further, because +Ff and +Fr are generated with respect to the front and rear-wheel slip angles +βf and +βr when the vehicle 10 moves back, a motion equation when the vehicle 10 moves back is expressed as an equation 6.

$$mV(\dot{\beta}-\gamma)=F_f-F_r$$

$$I\dot{\gamma}=l_fF_f-l_rF_r \qquad \text{[Equation 6]}$$

The motion equation when the vehicle 10 moves back expressed as the equation 6 means that the slip angle β and the yaw rate γ can be calculated if Ff and Fr are identified.

In the following description, processing for calculating Ff and Fr by the vehicle model portion 43E will be described with reference to FIG. 23.

Figure 23:
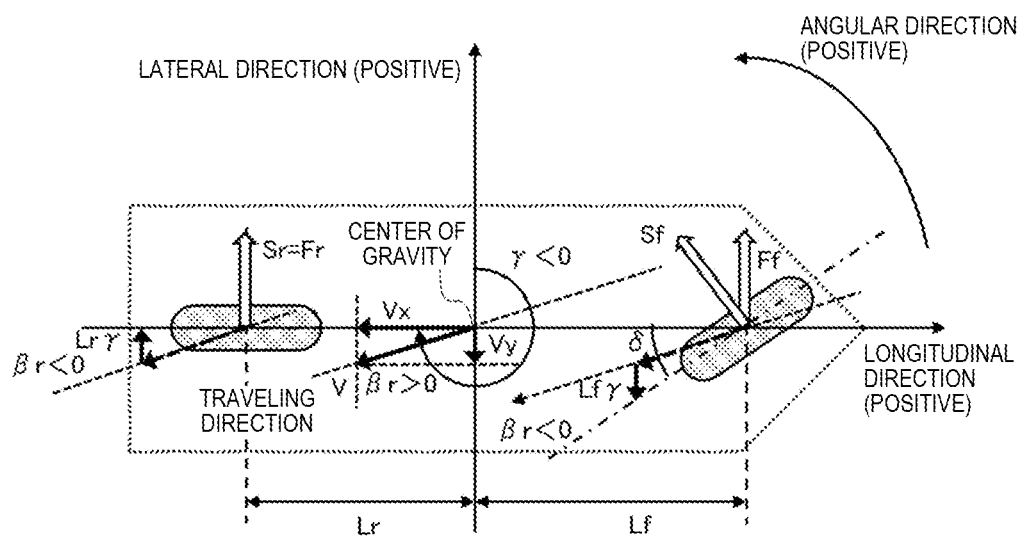
FIG. 23 illustrates processing for calculating cornering forces Fr and Fr.

In FIG. 23, the front-wheel tire steering angle δ=the steering-wheel steering angle δh/Gr is established, and, further, the vehicle longitudinal speed Vx=V·cos β and the vehicle lateral speed Vy=V sin β are acquired based on the vehicle speed V and the slip angle β.

Further, the front-wheel slip angle βf and the rear-wheel slip angle βr are calculated according to the following equations based on the vehicle longitudinal speed Vx, the vehicle lateral speed Vy, a distance Lf between the center of gravity and the front wheel, a distance Lr between the center of gravity and the rear wheel, the yaw rate γ, and the front-wheel tire angle δ.

$\beta f = \tan^{-1}\{(Vy+Lf\cdot\gamma)/Vx\} - \delta$ $\beta r = \tan^{-1}\{(Vy-Lr\cdot\gamma)/Vx\}$ Further, lateral forces Sf and Sr on the front and rear wheels are acquired as $Sf=+2\cdot Kf\cdot\beta f$ and $Sr=+2\cdot Kr\cdot\beta r$, respectively, based on the slip angles $\beta f$ and $\beta r$ and front and rear-wheel cornering power Kf and Kr (N*rad).

The + signs are added in the equations for calculating the lateral forces Sf and Sr because +Ff is generated with respect to +Bf.

Then, the cornering forces Ff and Fr are acquired as $Ff=Sf\cdot\cos\delta$ and $Fr=Sr$, respectively, based on the lateral forces Sf and Sr calculated in the above-described manner and the front-wheel tire angle $\delta$.

At this time, the vehicle model portion 43E calculates the slip angle $\beta$ and the yaw rate $\gamma$ by substituting the calculated cornering forces Ff and Fr into the equation 6.

The vehicle position update portion 43F inputs information about the slip angle $\beta$ and the yaw rate $\gamma$ calculated by the vehicle model portion 43E.

Figure 24:
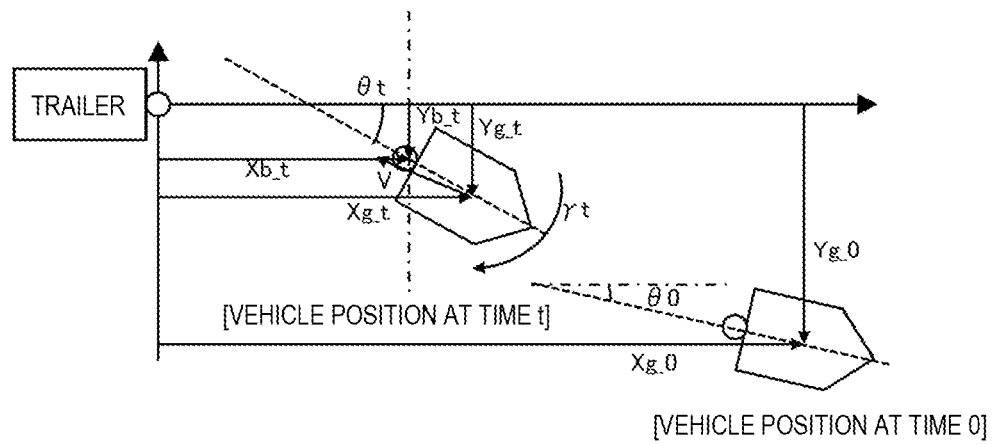
FIG. 24 illustrates processing for updating the position of the vehicle.

Then, the vehicle position update portion 43F calculates the center of gravity (Xg_t, Yg_t) and the yaw angle $\theta$t (refer to FIG. 24) of the vehicle 10 at time t in the coordinate system with the origin thereof placed at the position of the hitch coupler 30B according to an equation 7.

$\theta_t = \theta_0 + \int_0^t \gamma_t dt$ $X_{g\_t} = X_{g\_0} + V\int_0^t \cos(\beta_t+\theta_t)dt,\ Y_{g\_t} = Y_{g\_0} + V\int_0^t \sin(\beta_t+\theta_t)dt$ [Equation 7]

Further, the vehicle position update portion 43F calculates the position of the hitch ball 30A (Xb_t, Yb_t) at time t in the coordinate system with the origin thereof placed at the position of the hitch coupler 30B.

At this time, assuming that Lb (m) represents the distance between the center of gravity of the vehicle and the hitch ball 30A, the position of the hitch ball 30A (Xb_t, Yb_t) is calculated according to the following equations.

$Xb\_t = Xg\_t - Lb\cdot\cos\theta t$ $Yb\_t = Yg\_t - Lb\cdot\sin\theta t$

The coordinate conversion portion 43A inputs information about the position of the center of gravity of the vehicle 10 (Xg_t, Yg_t), the position of the hitch ball 30A (Xb_t, Yb_t), and the yaw angle $\theta$t at time t that are calculated by the vehicle position update portion 43F.

Figure 25:
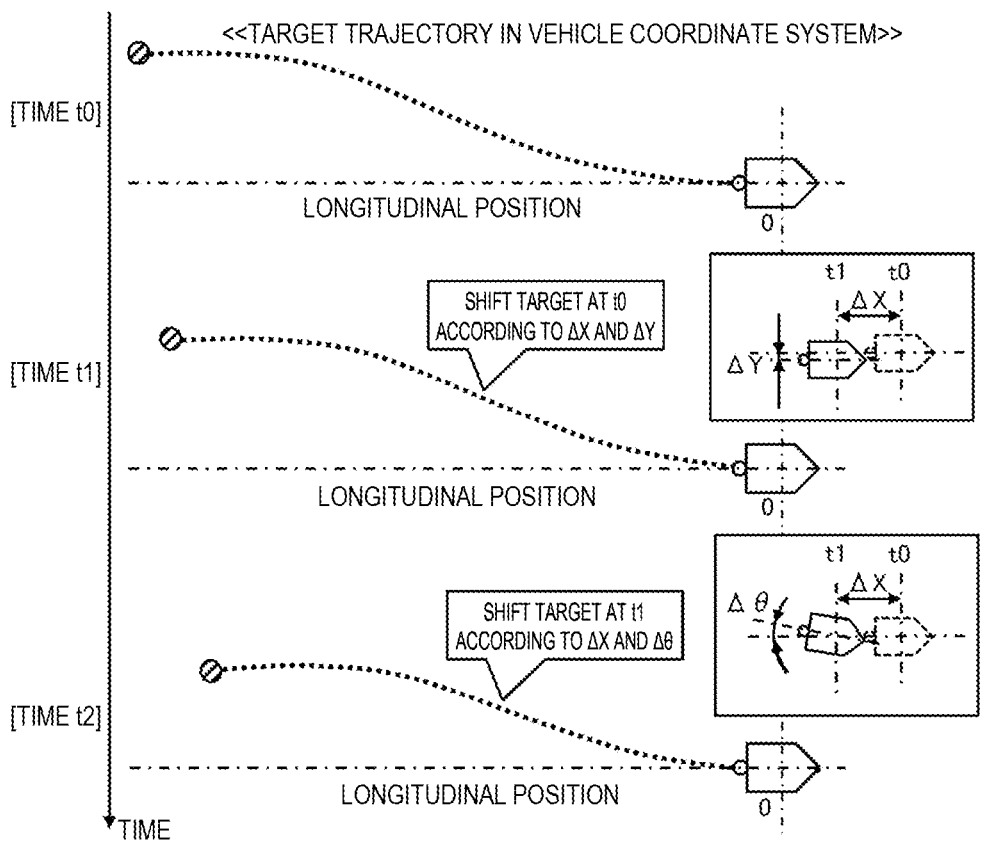
FIG. 25 illustrates processing for updating the target trajectory.

Then, the coordinate conversion portion 43A updates the target trajectory in the vehicle coordinate system so as to cancel off the change amount of the position and the change amount of the posture in one control cycle by translating each point on the target trajectory by movement amounts $\Delta X$ and $\Delta Y$ of the vehicle 10 between the control cycles and further rotationally moving each point on the target trajectory by a posture change amount $\Delta\theta$ of the vehicle 10 between the control cycles for each control cycle, as illustrated in FIG. 25.

In other words, the coordinate conversion portion 43A calculates the change amount of the posture and the movement amount of the vehicle 10 from the starting point and converts the coordinates of the initial target trajectory, thereby setting the target trajectory in the vehicle coordinate system.

It is also possible to recreate the target trajectory by newly setting control points and interpolating points according to the B-spline curve for each control cycle at this time, but a rotational movement at a small angle frequently occurs and calculation errors are accumulated in the hitching assist, so that the present embodiment converts the coordinates of the initial target trajectory and sets the target trajectory in the vehicle coordinate system for each control cycle.

Then, the coordinate conversion portion 43A outputs information about the updated target trajectory to the single-point preview LK controller 43B and the proportional FB controller 43C.

The proportional FB controller 43C performs feedback control on the steering angle based on a proportional operation, which calculates a lateral difference e (m) between the vehicle position and the target trajectory, and calculates a proportional FB steering angle $\delta$P_FB based on this lateral difference e (m) and a proportional gain constant Gp (rad/m).

Then, the proportional FB controller 43C outputs information about the calculated proportional FB steering angle $\delta$P_FB to the steering control unit 14.

At this time, the proportional FB controller 43C sets a reference position for calculating the lateral difference e to the position of the hitch ball 30A.

Setting the reference position for calculating the lateral difference e to the position of the hitch ball 30A can reduce a change in the trajectory around the hitch coupler 30B compared to when setting the reference position for calculating the lateral difference e to the position of the center of gravity of the vehicle 10.

Further, the proportional FB controller 43C can limit the section of the proportional control on the steering angle (a section in which the feedback control is performed) to around the hitch coupler 30B. More specifically, the proportional FB controller 43C stops the proportional control (the feedback control) until the distance from the vehicle 10 to the hitch coupler 30B falls below a set value, and performs the proportional control (the feedback control) after the distance from the vehicle 10 to the hitch coupler 30B falls below the set value.

However, an acquired verification result indicates that an overshoot occurs around the hitch coupler 30B to similar degrees between when the proportional control is performed in the entire range of the target trajectory and when the proportional control is performed only around the hitch coupler 30B. Therefore, in the present embodiment, the proportional FB controller 43C performs the proportional control in the entire range of the target trajectory.

Further, the proportional gain constant Gp is a value adapted when the hitching assist control unit 40 is designed and developed so as to improve the convergence to the position of the hitch coupler 30B, and is set to, for example, approximately 3.0 (rad/m).

Then, a success rate of the hitching assist depends on the positional relationship between the vehicle 10 and the trailer 20 when the hitching assist is started (am initial state).

Figure 26:
FIG. 26 exemplarily illustrates a positional relationship that makes the hitching assist highly difficult.

When the trailer 20 is considerably laterally positionally misaligned from the region behind the vehicle 10 as illustrated in FIG. 26, such a positional relationship raises the necessity of moving back the vehicle 10 while significantly wiggling it, thereby making the hitching assist difficult. On the other hand, when the trailer 20 is located in the region behind the vehicle 10 as illustrated in FIG. 27, such a positional relationship requires only a generally linear backward movement of the vehicle 10, thereby making the hitching assist less difficult.

Figure 27:
FIG. 27 exemplarily illustrates a positional relationship that makes the hitching assist less difficult.
Figure 28:
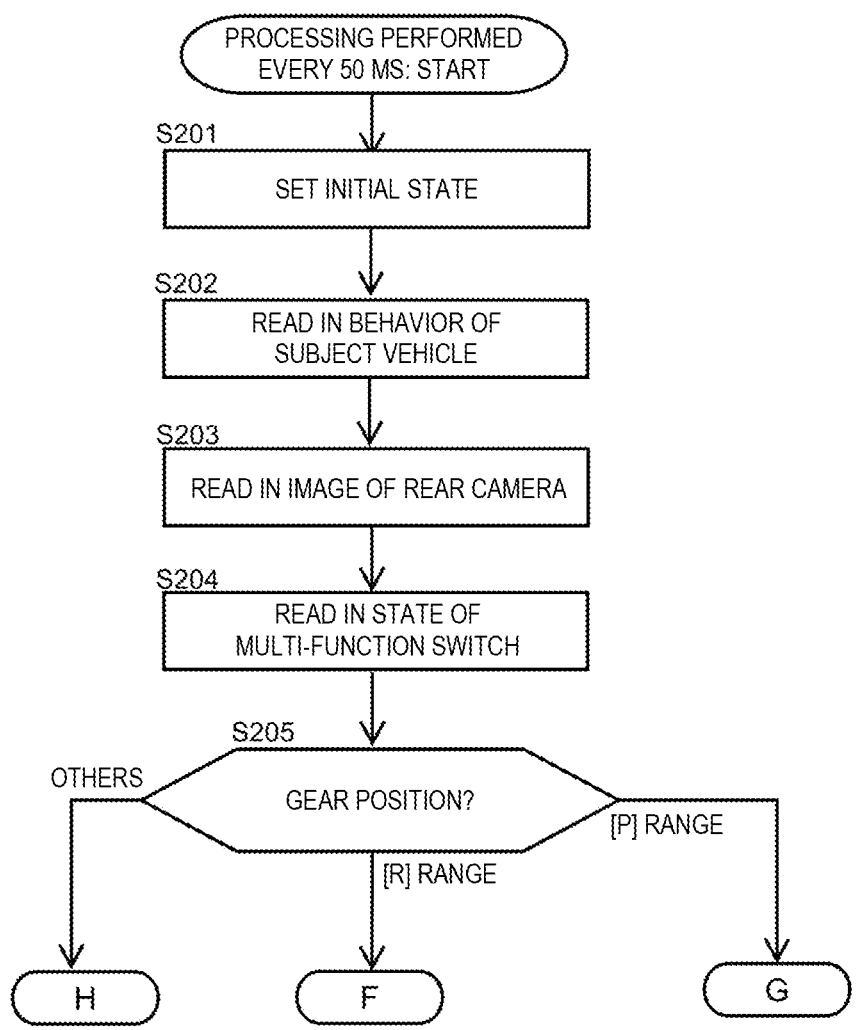
FIG. 28 is a flowchart illustrating a procedure for the hitching assist.
Figure 29:
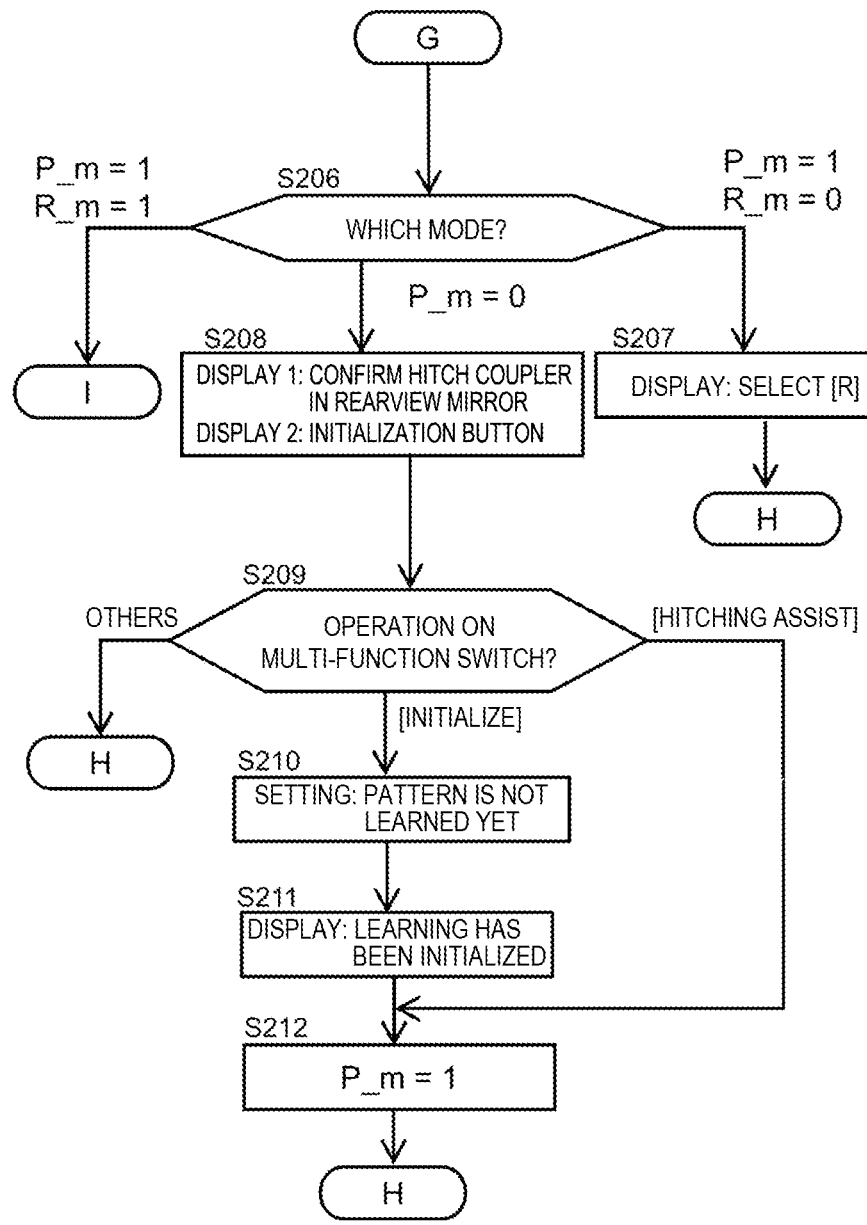
FIG. 29 is a flowchart illustrating the procedure for the hitching assist.
Figure 30:
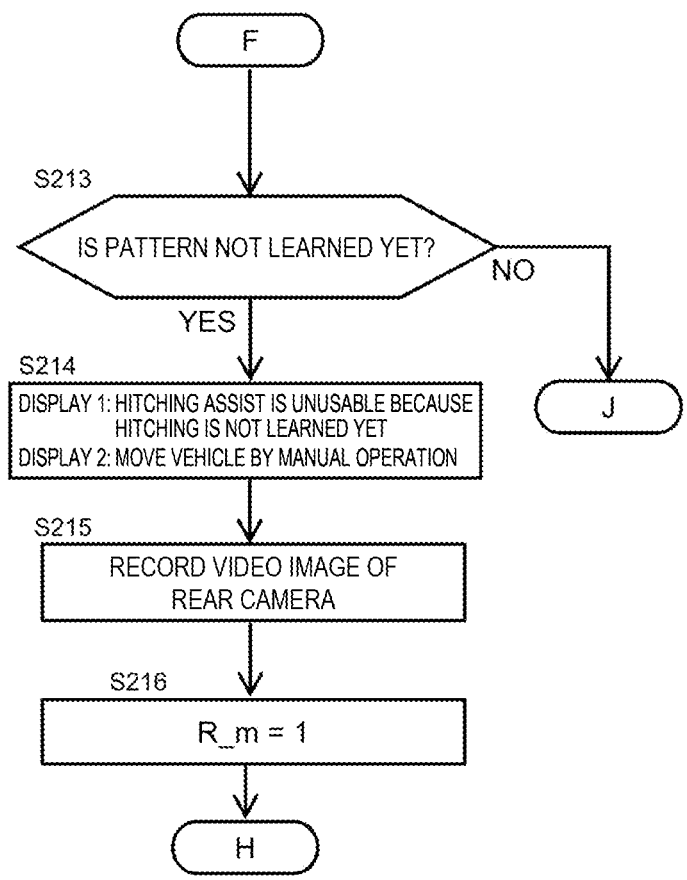
FIG. 30 is a flowchart illustrating the procedure for the hitching assist.
Figure 31:
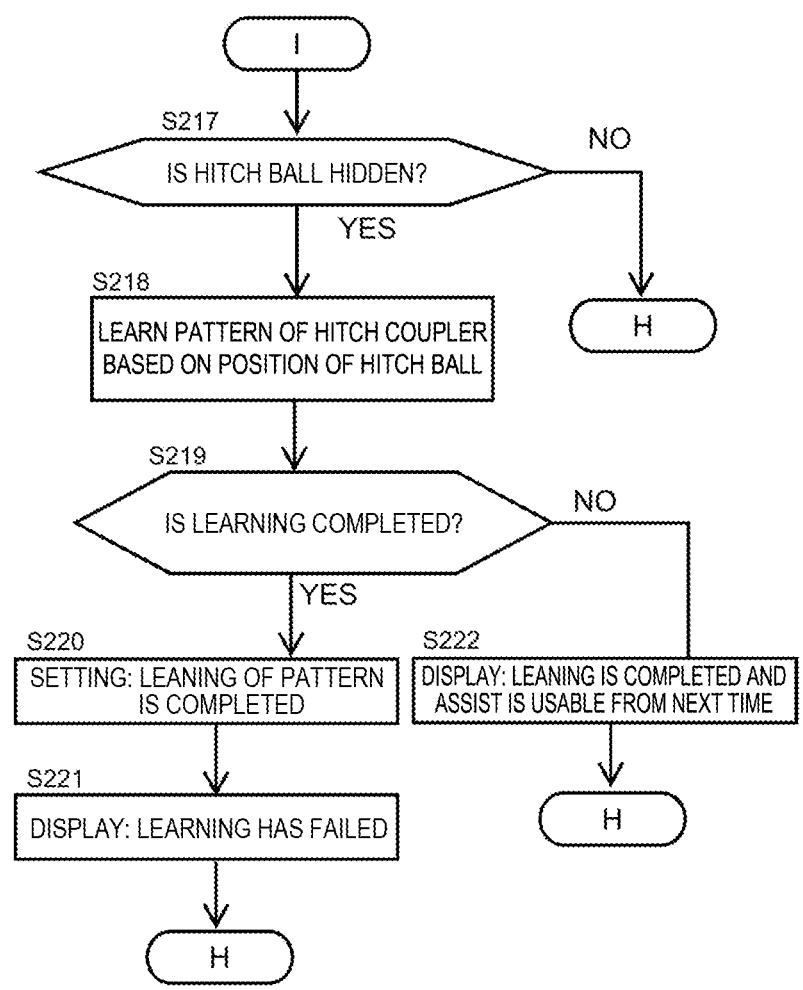
FIG. 31 is a flowchart illustrating the procedure for the hitching assist.
Figure 32:
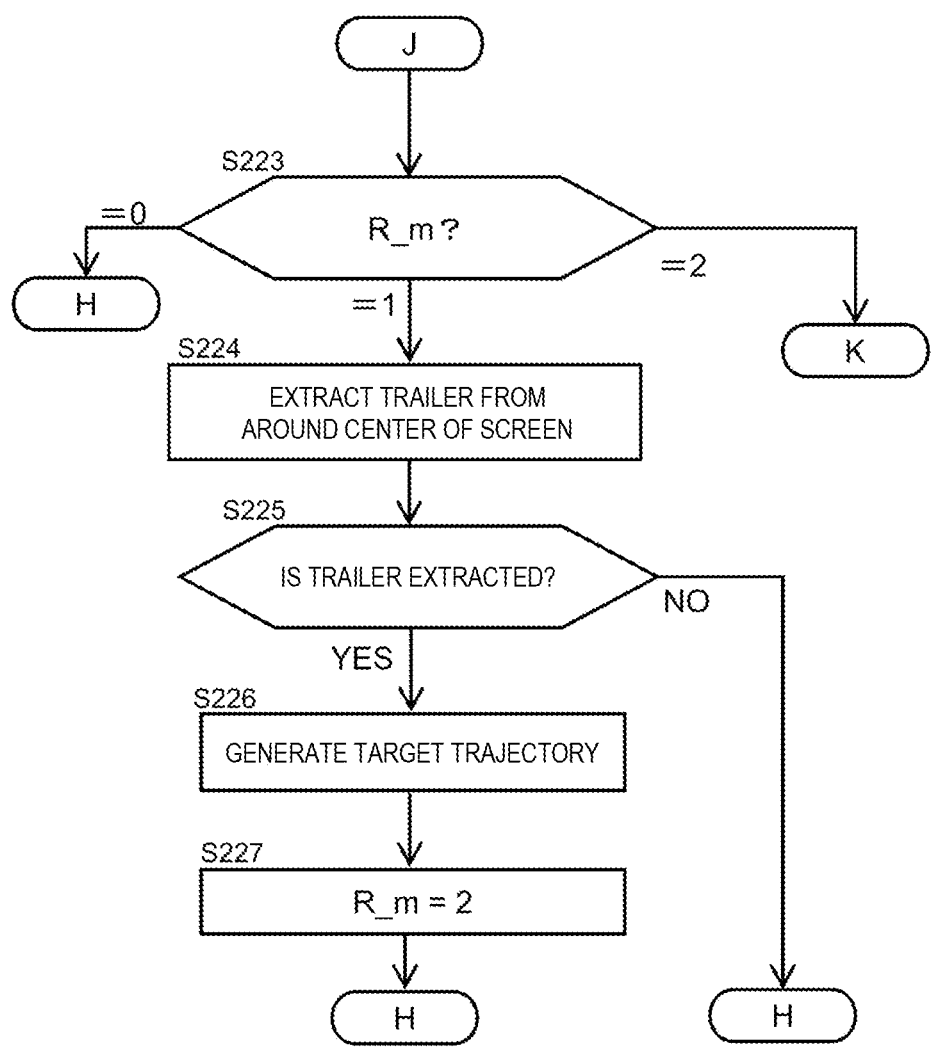
FIG. 32 is a flowchart illustrating the procedure for the hitching assist.
Figure 33:
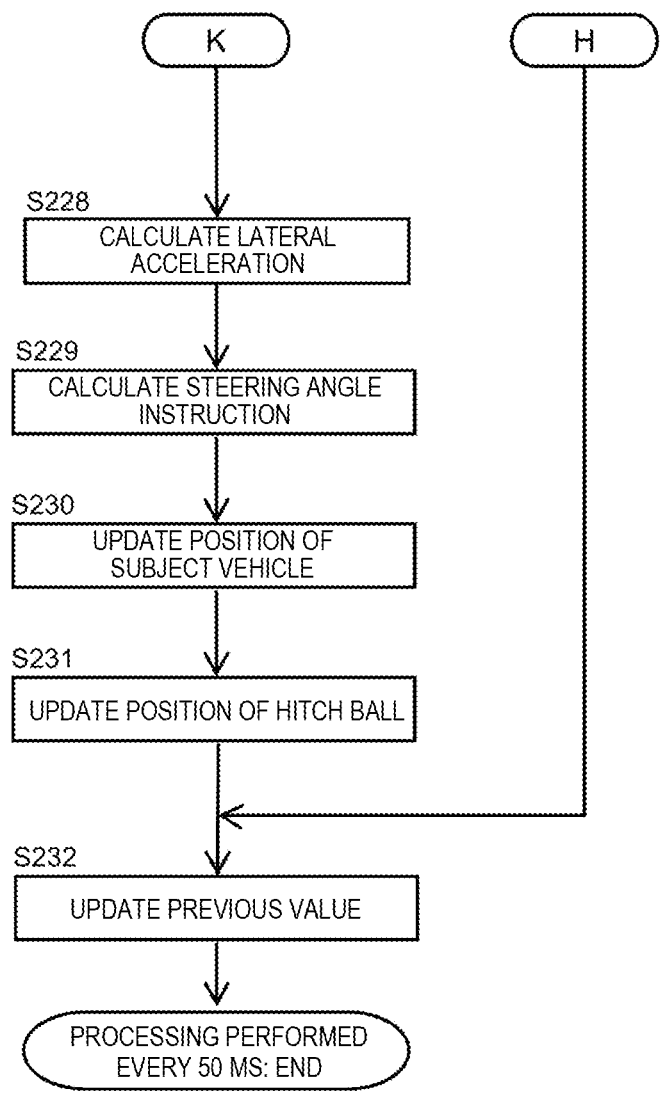
FIG. 33 is a flowchart illustrating the procedure for the hitching assist.

The driver of the vehicle 10 can be aware of the state that the hitching assist is less difficult with the trailer 20 located in the region behind the vehicle 10 as illustrated in FIG. 27 as a state that the entire trailer 20 targeted for the hitching can be visually confirmed in a rearview mirror 10A.

Then, the hitching assist control unit 40 can increase the success rate of the hitching assist if executing the hitching assist while employing the establishment of such a positional relationship that the driver can visually confirm the entire trailer 20 targeted for the hitching in the rearview mirror 10A of the vehicle 10 as a start condition.

Further, if the image pattern of the hitch coupler 30B is learned with the image quality of the rear camera 60 kept in good condition, this can lead to an increase in the accuracy of the perception of the hitch coupler 30B by the hitching assist control unit 40, thereby leading to an increase in the success rate of the hitching assist.

For this reason, the hitching assist control unit 40 can increase the success rate of the hitching assist if learning the image pattern of the hitch coupler 30B when the image quality of the rear camera 60 is kept in good condition.

In the following description, a second embodiment will be described with reference to flowcharts illustrated in FIGS. 28 to 33. The above-described condition for starting the hitching assist and condition for learning the image pattern are added in the second embodiment.

The hitching assist control unit 40 performs similar processing in steps S201 to S207 in the flowcharts illustrated in FIGS. 28 to 33 to the above-described steps, steps S101 to step S107 in the flowcharts illustrated in FIGS. 4 to 8, and therefore the detailed description of the content of the processing in steps S201 to S207 will be omitted here.

In step S208, the hitching assist control unit 40 controls the display on the information display 50.

In the above-described step, step S108, the hitching assist control unit 40 displays the display content 108-1: "To request the hitching assist, press the "Hitching Assist" button." as the display control on the information display 50.

On the other hand, the hitching assist control unit 40 displays the following display content 208-1 on the information display 50 instead of the above-described display content 108-1.

Display Content 208-1: "To request the hitching assist, press the "Hitching Assist" button after confirming that you can view the trailer in the rearview mirror."

In other words, the hitching assist control unit 40 starts the hitching assist upon satisfaction with such a condition that the trailer 20 targeted for the hitching is positioned so as to be viewed in the rearview mirror 10A, i.e., that the trailer 20 targeted for the hitching is displayed around the center (a predetermined region) of the image of the rear camera 60.

As a result, the present configuration can reduce the load of the image processing on the rear camera 60 in the hitching assist processing, and, further, can reduce the necessity of moving back the vehicle 10 while considerably steering the vehicle 10, thereby making the hitching assist less difficult and thus improving the success rate of the hitching assist.

Further, the hitching assist control unit 40 allows the driver to easily understand that the hitching assist is started provided that the trailer 20 is positioned so as to be able to be viewed in the rearview mirror 10A, and the success rate of the hitching assist is improved by satisfying this start condition, by displaying the above-described display content 208-1.

Further, the hitching assist control unit 40 can prompt the driver to perform the operation of moving the vehicle 10 to a position at which the trailer 20 can be viewed in the rearview mirror 10A, i.e., a preparation operation for causing the hitching assist to start before starting the hitching assist by displaying the above-described display content 208-1.

The hitching assist control unit 40 displays a display content 208-2 on the information display 50 in step S208, with the display content 208-2 indicating the same content as the display content 108-2: "To change the trailer, press the "Initialize" button." in step S108.

The hitching assist control unit 40 performs similar processing in the next steps, steps S209 to S214 to the above-described steps, steps S109 to step S114 in the flowcharts illustrated in FIGS. 4 to 8, and therefore the detailed description of the content of the processing in steps S209 to S214 will be omitted here.

In step S215, the hitching assist control unit 40 records the image behind the vehicle 10 that is captured by the rear camera 60 similarly to the above-described step, step S115, but, further records the detected values of the yaw rate and the longitudinal G i.e., the behavior of the vehicle 10 synchronized with the recorded image.

The physical amount indicating the behavior of the vehicle 10 that is recorded together with the recorded image in step S215 is not limited to the yaw rate and the longitudinal G, and can be a physical amount regarding the behavior of the vehicle, such as the steering angle, the vehicle speed, a change in the steering angle, and a change in the vehicle speed.

The hitching assist control unit 40 can make an image correction for reducing the influence of the behavior based on the direction of this vehicle behavior and the images preceding and subsequent thereto at the time of such a behavior scene that the image quality is deteriorated, by storing information about the physical amount indicating the behavior of the vehicle 10, such as the yaw rate and the longitudinal G, in synchronization with the recorded image.

For example, capturing an image under a condition that the longitudinal G is large leads to extension of the screen in the vertical direction. In this case, if identifying a change in the pitch angle per G in advance, the hitching assist control unit 40 can determine how many degrees the pitch angle is changed based on a change in the G with respect to a sampling interval.

Then, the hitching assist control unit 40 can acquire a corrected image in which the influence of the longitudinal G is reduced by converting the change in the pitch angle into the number of pixels and correcting the image so as to reduce the extension in the vertical direction.

Further, when the image is captured under a condition that the yaw rate is high, the hitching assist control unit 40 can correct extension of the screen in the horizontal direction based on the information about the yaw rate pre-recorded in synchronization with the recorded image.

Regarding the content of processing in the next steps, steps S216 to S218, the hitching assist control unit 40 performs similar processing to the above-described steps, steps S116 to step S118 in the flowcharts illustrated in FIGS. 4 to 8, and therefore the detailed description of the content of the processing in steps S216 to S218 will be omitted here.

In step S219, the hitching assist control unit 40 determines whether the learning of the image pattern of the hitch coupler 30B is completed.

In the above-described step, step S119, the hitching assist control unit 40 determines that the learning is completed if the image pattern can be learned for each condition with respect to all of the conditions corresponding to the different distances from the vehicle 10.

On the other hand, in step S219, the hitching assist control unit 40 determines whether all of the vehicle behaviors recorded in step S215 satisfy the following determination conditions in addition to whether the image pattern can be learned for each condition with respect to all of the conditions corresponding to the different distances from the vehicle 10.

abs (the yaw rate)<a first predetermined value
abs (the longitudinal G)<a second predetermined value In these conditions, abs(A) is a function that returns an absolute value of a variable A.

Then, if being able to learn the image pattern for each distance with respect to all of the distances and all of the recorded vehicle behaviors also satisfy the determination conditions, the hitching assist control unit 40 determines that the learning is completed and proceeds to step S220.

In other words, the hitching assist control unit 40 acquires the image pattern of the hitch coupler 30B from the image acquired by the rear camera 60 when a change in the behavior of the vehicle 10 is smaller than a predetermined level.

On the other hand, if the above-described learning completion condition is not satisfied, the hitching assist control unit 40 proceeds to step S222.

In other words, the rear camera 60 captures an unsuitable image of the hitch coupler 30B to the pattern matching when the vehicle behavior is dynamic. Therefore, when the image is recorded with the vehicle dynamically behaving, the hitching assist control unit 40 determines that the learning has failed and proceeds to step S222, thereby being prevented from erroneously detecting the position of the hitch coupler 30B due to the pattern matching based on the unsuitable image and reducing the success rate of the hitching assist.

Regarding the content of processing in steps S220 to S223, the hitching assist control unit 40 performs similar processing to the above-described steps, steps S120 to step S123 in the flowcharts illustrated in FIGS. 4 to 8, and therefore the detailed description of the content of the processing in steps S220 to S223 will be omitted here.

In step S224, the hitching assist control unit 40 performs the processing for extracting the trailer 20 from the image of the rear camera 60 to generate the target trajectory, similarly to step S124.

More specifically, the hitching assist control unit 40 determines the trailer region by detecting a combination of a pair of vertical edges emerging at the left and right end portions of the trailer 20 and horizontal edges emerging therebetween.

At this time, when being able to detect one pair of vertical edges and horizontal edges therebetween, the hitching assist control unit 40 carries out pattern matching that extracts a portion most highly correlated to the image pattern of the hitch coupler 30B from the image region between the one pair of vertical edges as the image region of the hitch coupler 30B with use of the learned image pattern of the hitch coupler 30B.

In the processing for extracting the trailer 20 in the above-described step, step S224, the hitching assist control unit 40 limits the region of the extraction processing to around the center of the screen (for example, a range of ±20 degrees from the center of the screen).

Since the hitching assist control unit 40 presents the display "To request the hitching assist, press the "Hitching Assist" button after confirming that you can view the trailer in the rearview mirror." toward the driver in the above-described step, step S208, the trailer 20 is highly likely located at a position that allows the driver to visually confirm the trailer 20 in the rearview mirror 10A, i.e., a position displayed at the center of the screen of the rear camera 60.

The region around the center of the screen from which the hitching assist control unit 40 extracts the image region of the trailer 20 at this time is a region in which the trailer 20 is displayed in the image of the rear camera 60 when the trailer 20 is located at the position that allows the driver to visually confirm the trailer 20 in the rearview mirror 10A of the vehicle 10, i.e., a region in which the trailer 20 is projected on the rearview mirror 10A.

Then, the hitching assist control unit 40 performs the processing for extracting the trailer 20 limitedly on around the center of the screen, thereby being able to extract the image region of the trailer 20 while reducing the calculation load compared to when extracting the image region of the trailer 20 from the entire image.

Further, when the trailer 20 is not displayed around the center of the screen of the rear camera 60, this indicates that the hitching assist is highly difficult because the trailer 20 is considerably laterally positionally misaligned from the region behind the vehicle 10, i.e., the success rate of the hitching assist reduces as the vehicle 10 should be moved back while being significantly steered.

This means that, when the image region of the trailer 20 can be extracted from around the center of the screen of the rear camera 60, the vehicle is less required to be moved back while being considerably steered and the hitching assist can be executed with a sufficiently high success rate.

Therefore, in the next step, step S225, the hitching assist control unit 40 determines whether the image region of the trailer 20 can be extracted from around the center of the screen. Then, if the image region of the trailer 20 can be extracted (i.e., the present situation satisfies the condition that the trailer 20 can be visually confirmed in the rearview mirror 10A of the vehicle 10), the hitching assist control unit 40 proceeds to step S226 and generates the target trajectory.

In sum, the hitching assist control unit 40 starts the assist in the hitching between the vehicle 10 and the trailer 20 when the trailer 20 is displayed in the predetermined region of the image of the rear camera 60 in the initial state of the hitching and the hitching assist is less difficult without being required to provide a large steering angle in the hitching assist.

On the other hand, if the image region of the trailer 20 cannot be extracted from around the center of the screen, i.e., the success rate of the hitching assist can be estimated to be low with the position of the trailer 20 considerably laterally misaligned, the hitching assist control unit 40 proceeds to step S232 while skipping steps S226 and S227.

This can prevent the hitching assist control unit 40 from executing the hitching assist with the vehicle 10 and the trailer 20 located in a bad-conditioned positional relationship, thereby preventing the hitching assist from ending up in failure.

Regarding the content of processing in the subsequent steps, steps S226 to S232, the hitching assist control unit 40 performs similar processing to the above-described steps, steps S125 to step S131 in the flowcharts illustrated in FIGS. 4 to 8, and therefore the detailed description of the content of the processing in steps S226 to S232 will be omitted here.

After displaying the content "To request the hitching assist, press the "Hitching Assist" button after confirming that you can view the trailer in the rearview mirror." in step S208, the hitching assist control unit 40 can perform the processing for extracting the trailer 20 from the entire screen in step S224.

Each technical idea described in the above-described embodiments can be used in combination as appropriate within a range not creating a contradiction.

Having described the contents of the present invention specifically with reference to the preferred embodiments thereof, it is apparent to those skilled in the art that the present invention can be embodied by various modifications based on the basic technical idea and teaching of the present invention.

For example, the hitch that hitches the vehicle 10 and the trailer 20 is not limited to the combination of the hitch ball 30A and the hitch coupler 30B.

Further, the condition for learning the image pattern of the hitch coupler 30B and/or the condition for starting the hitching assist can include a condition that the weather is not a rainfall or snowfall condition, a condition that the illuminance of the region displayed by the rear camera 60 is equal to or higher than a set level, and the like.

Further, it is apparent that the display content on the information display 50 can be changed as appropriate within a range that still allows the driver to understand the intention of the notification.

Further, the notification to the driver is not limited to the display onto the information display 50, and the hitching assist control unit 40 can issue the notification to the driver by, for example, audio navigation.

Further, the hitching assist control unit 40 can acquire the image pattern of the hitch coupler 30B by reading out it from a database based on identification information of the trailer 20 or the hitch coupler 30B.

Further, the hitching assist control unit 40 can re-learn the image pattern of the hitch coupler 30B based on the image captured by the rear camera 60 while executing the hitching assist.

Further, the hitching assist control unit 40 can also learn an image pattern of the trailer 20 when learning the image pattern of the hitch coupler 30B, and can extract the trailer 20 from the image of the rear camera 60 based on the pre-learned image pattern of the trailer 20 when executing the hitching assist.

Further, the hitching assist control unit 40 can move back the vehicle 10 at an appropriate speed in the hitching assist state by outputting an instruction for controlling the driving torque (the vehicle speed) of the vehicle 10 together with the steering instruction in the hitching assist.

Further, the hitching assist control unit 40 can detect that the vehicle 10 and the trailer 20 are hitched manually by the driver based on an operation performed by the driver or an output of a connection sensor that detects whether the hitch ball 30A and the hitch coupler 30B are connected, and learn the image pattern of the hitch coupler 30B based on the image of the rear camera 60 at this time.

Further, in a case where the vehicle 10 includes a four-wheel steering system, the hitching assist control unit 40 can output a steering instruction directed to the front wheels and/or a steering instruction directed to the rear wheels to make the trajectory of the backward movement of the vehicle 10 closer to the target trajectory.

Further, when it is difficult to cause the vehicle 10 to follow the target trajectory by controlling the steering, for example, when the maximum curvature of the target trajectory is larger than a setting value, the hitching assist control unit 40 can cancel the hitching assist and issue a notification prompting the driver to correct the positional relationship between the vehicle 10 and the trailer 20 toward the driver.

Then, technical ideas recognizable from the above-described embodiments will be described in the following description.

A vehicle hitching assist apparatus, as one configuration thereof, is configured to assist in hitching between a trailer including a hitch coupler and a vehicle including a hitch ball connected to the hitch coupler and configured to tow the trailer. From an image acquired by a rear camera configured to capture an image behind the vehicle, the vehicle hitching assist apparatus extracts an image region of the hitch coupler based on a position of the hitch ball from the image when the hitch ball is hidden. At the time of the hitching after that, the vehicle hitching assist apparatus identifies a position of the hitch coupler based on a comparison between the image region and the image acquired by the rear camera, and controls a steering angle of the vehicle so as to move the hitch ball toward the hitch coupler.

In a preferable configuration of the vehicle hitching assist apparatus, the vehicle hitching assist apparatus records the image acquired by the rear camera in the course of the hitching, and repeats processing that searches for the hitch coupler to newly extract the image region from the image that the vehicle hitching assist apparatus temporally dates back to based on the already extracted image region, starting from the image when the hitch ball is hidden, thereby acquiring image regions of the hitch coupler under a plurality of conditions corresponding to different distances from the rear camera to the hitch coupler.

Further, in a preferable configuration of the vehicle hitching assist apparatus, the vehicle hitching assist apparatus extracts the image region of the hitch coupler from the image acquired by the rear camera when a change in a behavior of the vehicle is smaller than a predetermined level.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of one embodiment can be replaced with the configuration of another embodiment. Further, one embodiment can also be implemented with a configuration of another embodiment added to the configuration of this embodiment. Further, each of the embodiments can also be implemented with another configuration added, deleted, or replaced with respect to a part of the configuration of this embodiment.

The present application claims priority under the Paris Convention to Japanese Patent Application No. 2018-156122 filed on Aug. 23, 2018. The entire disclosure of Japanese Patent Application No. 2018-156122 filed on Aug. 23, 2018 including the specification, the claims, the drawings, and the abstract is incorporated herein by reference in its entirety.

REFERENCE SIGNS LIST 10 vehicle
10A rearview mirror
11, 11 front wheel
12, 12 rear wheel
13 electric power steering apparatus
14 steering control unit (steering controller)
20 trailer
30A hitch ball (first hitch portion)

30B hitch coupler (second hitch portion)
40 hitching assist control unit (vehicle hitching assist apparatus or controller)
60 rear camera (external world perception sensor)

The invention claimed is:

1. An apparatus comprising:
a vehicle hitching assist apparatus, the vehicle hitching assist apparatus being arranged in a vehicle equipped with a hitch, the vehicle hitching assist apparatus also being configured to assist in hitching between the vehicle including a first hitch portion and a trailer including a second hitch portion connected to the first hitch portion, wherein the vehicle hitching assist apparatus comprises
a microcomputer configured to execute a first mode and a second mode,
wherein the first mode configured to, when an image pattern of the second hitch portion is acquired, detect a position of the second hitch portion based on a comparison between the image pattern and a first image acquired by an external world perception sensor mounted on a rear portion of the vehicle, and output a steering instruction for assisting in the hitching between the trailer and the vehicle based on the detected position of the second hitch portion to a steering controller of the vehicle; and
the second mode configured to, when the image pattern is not acquired, issue a notification for prompting a driver of the vehicle to manually hitch the trailer and the vehicle,
wherein the vehicle hitching assist apparatus learns the image pattern of only the second hitch portion that is provided on the trailer, when the first hitch portion is hidden from the image acquired by the external world perception sensor when the trailer and the vehicle are hitched manually in the second mode, and
wherein the vehicle hitching assist apparatus repeats processing that dates back from an immediately preceding image toward the first image among images of the external world perception sensor that have been recorded in a course of the hitching by a driver's operation and extracts a region shaped similarly to an image region of the second hitch portion extracted in the immediately preceding image from the first image as the image region of the second hitch portion, thereby learning the image pattern of the second hitch portion for each of a plurality of conditions corresponding to different distances from the vehicle.

2. The apparatus according to claim 1, wherein the vehicle hitching assist apparatus performs the processing for learning the image pattern based on the first image acquired by the external world perception sensor and a position of the first hitch portion that are recorded when the first hitch portion and the second hitch portion are connected manually in the second mode.

3. The apparatus according to claim 1, wherein the vehicle hitching assist apparatus performs the processing for learning the image pattern based on the first image acquired by the external world perception sensor when a change in a behavior of the vehicle is smaller than a predetermined level.

4. The apparatus according to claim 1, wherein the vehicle hitching assist apparatus issues the notification for prompting the driver of the vehicle to change a condition of the manual hitching, when the processing for learning the image pattern has failed.

5. The apparatus according to claim 1, wherein the vehicle hitching assist apparatus records the first image acquired by the external world perception sensor when the first hitch portion and the second hitch portion are connected manually in the second mode, and starts the processing for learning the image pattern upon completion of a manual connection between the first hitch portion and the second hitch portion.

6. The apparatus according to claim 1, wherein the vehicle hitching assist apparatus starts assisting in the hitching between the trailer and the vehicle with the trailer displayed in a predetermined region of the first image acquired by the external world perception sensor in the first mode.

7. The apparatus according to claim 6, wherein the predetermined region is a region in which the trailer is projected on a rearview mirror of the vehicle.

8. A method comprising:
providing a vehicle;
providing a trailer that is connectable to the vehicle;
mounting an external world perception sensor on a rear portion of the vehicle;
arranging a hitching assist apparatus in the vehicle, wherein the hitching assist apparatus is configured to assist in hitching between a vehicle including a first hitch portion and the trailer including a second hitch portion connected to the first hitch portion,
detecting a position of the second hitch portion based on a comparison between an image pattern of the second hitch portion and a first image acquired by the external world perception sensor and outputting a steering instruction for assisting in the hitching between the trailer and the vehicle based on the detected position of the second hitch portion to a steering controller of the vehicle, when the image pattern of the second hitch portion is acquired; and
issuing a notification for prompting a driver of the vehicle to manually hitch the trailer and the vehicle, when the image pattern is not acquired,
wherein the vehicle hitching assist method further comprising:
learning the image pattern of only the second hitch portion provided on the trailer, when the first hitch portion is hidden from the first image acquired by the external world perception sensor when the trailer and the vehicle are hitched manually in the second mode,
wherein the learning includes:
repeating processing that dates back from an immediately preceding image toward the first image among images of the external world perception sensor that have been recorded in a course of the hitching by a driver's operation, and
extracting a region shaped similarly to an image region of the second hitch portion extracted in the immediately preceding image from the first image as the image region of the second hitch portion, thereby learning the image pattern of the second hitch portion for each of a plurality of conditions corresponding to different distances from the vehicle.

9. A system comprising:
a vehicle;
a controller that is mounted on the vehicle;
a trailer that is connectable to the vehicle; and
an external world reception sensor mounted on a rear portion of the vehicle, wherein the controller is configured to: i) assist in hitching between the vehicle including a first hitch portion and a trailer including a second hitch portion connected to the first hitch portion, ii) when an image pattern of the second hitch portion is acquired, detect a position of the second hitch portion based on a comparison between the image pattern and a first image acquired by the external world perception sensor, iii) output a steering instruction for assisting in the hitching between the trailer and the vehicle based on the detected position of the second hitch portion to a steering controller of the vehicle, and iv) when the image pattern is not acquired, issue a notification for prompting a driver of the vehicle to manually hitch the trailer and the vehicle, and wherein the vehicle hitching assist apparatus learns the image pattern of only the second hitch portion provided on the trailer when the first hitch portion is hidden from the first image acquired by the external world perception sensor when the trailer and the vehicle are hitched manually in the second mode wherein the vehicle hitching assist apparatus repeats processing that dates back from an immediately preceding image toward the first image among images of the external world perception sensor that have been recorded in a course of the hitching by a driver's operation and extracts a region shaped similarly to an image region of the second hitch portion extracted in the immediately preceding image from the first image as the image region of the second hitch portion, thereby learning the image pattern of the second hitch portion for each of a plurality of conditions corresponding to different distances from the vehicle.

\* \* \* \* \*